US010739856B2

(12) United States Patent
Yokoyama et al.

(10) Patent No.: US 10,739,856 B2
(45) Date of Patent: Aug. 11, 2020

(54) CONTROL DEVICE AND A CONTROL METHOD TO CAUSE A USER TO PERCEIVE A TACTILE STIMULI

(71) Applicant: SONY CORPORATION, Tokyo (JP)

(72) Inventors: Ryo Yokoyama, Tokyo (JP); Yusuke Nakagawa, Kanagawa (JP); Ikuo Yamano, Tokyo (JP); Osamu Ito, Tokyo (JP); Yosuke Matsuzaki, Kanagawa (JP); Takeshi Ogita, Tokyo (JP); Ayumi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/087,298

(22) PCT Filed: Feb. 3, 2017

(86) PCT No.: PCT/JP2017/004067
§ 371 (c)(1),
(2) Date: Sep. 21, 2018

(87) PCT Pub. No.: WO2017/169115
PCT Pub. Date: Oct. 5, 2017

(65) Prior Publication Data
US 2019/0101987 A1 Apr. 4, 2019

(30) Foreign Application Priority Data
Mar. 30, 2016 (JP) ................. 2016-069361

(51) Int. Cl.
G06F 3/01 (2006.01)
G06F 3/0488 (2013.01)
(Continued)

(52) U.S. Cl.
CPC .............. *G06F 3/016* (2013.01); *G06F 3/038* (2013.01); *B06B 1/0207* (2013.01); *G06F 3/0488* (2013.01)

(58) Field of Classification Search
None
See application file for complete search history.

(56) References Cited

U.S. PATENT DOCUMENTS

2012/0226414 A1* 9/2012 Tomizaki .............. F16F 15/002
701/36
2016/0364001 A1 12/2016 Hirose et al.

FOREIGN PATENT DOCUMENTS

JP  2007-090956 A   4/2007
JP  2008-257295 A   10/2008
(Continued)

OTHER PUBLICATIONS

International Search Report and Written Opinion of PCT Application No. PCT/JP2017/004067, dated Mar. 7, 2017, 10 pages of ISRWO.

*Primary Examiner* — Daniell L Negron
(74) *Attorney, Agent, or Firm* — Chip Law Group

(57) ABSTRACT

To provide a structure capable of causing a user to perceive a desired tactile stimulus more reliably. A control device including: an information acquisition unit configured to obtain first information regarding a tactile stimulus transferred from a first tactile stimulus generation source and second information regarding a tactile stimulus which a user is caused to perceive; and a control unit configured to control output of a tactile stimulus of a second tactile stimulus generation source different from the first tactile stimulus generation source on a basis of the first information and the second information. Further, a control method using a processor and a computer system program.

17 Claims, 17 Drawing Sheets

(51) Int. Cl.
 *B06B 1/02* (2006.01)
 *G06F 3/038* (2013.01)

(56) References Cited

FOREIGN PATENT DOCUMENTS

| | | |
|---|---|---|
| JP | 2009-154592 A | 7/2009 |
| JP | 2012-103852 A | 5/2012 |
| WO | 2015/136923 A1 | 9/2015 |

\* cited by examiner

CONTROL DEVICE AND A CONTROL METHOD TO CAUSE A USER TO PERCEIVE A TACTILE STIMULI

CROSS REFERENCE TO RELATED APPLICATIONS

This application is a U.S. National Phase of International Patent Application No. PCT/JP2017/004067 filed on Feb. 3, 2017, which claims priority benefit of Japanese Patent Application No. JP 2016-069361 filed in the Japan Patent Office on Mar. 30, 2016. Each of the above-referenced applications is hereby incorporated herein by reference in its entirety.

TECHNICAL FIELD

The present disclosure relates to a control device, a control method, and a program.

BACKGROUND ART

In recent years, with the development of hardware technologies and software technologies related to tactile vibrations, various technologies have been developed for control of tactile vibration. For example, Patent Literature 1 discloses an information processing device that delays output of tactile vibration in accordance with a position at which an event occurs in a virtual space. In addition, Patent Literature 2 discloses a device that determines synchronism of operations of a plurality of users and controls a plurality of feedback devices (devices that output tactile stimuli, such as vibration generation devices) on the basis of a determination result to deliver evaluation of operations to users who wear the plurality of feedback devices.

CITATION LIST

Patent Literature

Patent Literature 1: JP 2015-166890A
Patent Literature 2: JP 2011-087794A

DISCLOSURE OF INVENTION

Technical Problem

In the technologies of the related art, however, it was difficult to cause users to perceive desired tactile stimuli in some cases. For example, in a case in which there are tactile stimuli other than output tactile stimuli, users perceive output tactile stimuli and the other tactile stimuli. In addition, the output tactile stimuli propagate to locations other than desired presentation locations in some cases. Therefore, it is desirable to cause users to perceive the output tactile stimuli more clearly.

Accordingly, the present disclosure proposes a structure capable of causing a user to perceive a desired tactile stimulus more reliably.

Solution to Problem

According to the present disclosure, there is provided a control device including: an information acquisition unit configured to obtain first information regarding a tactile stimulus transferred from a first tactile stimulus generation source and second information regarding a tactile stimulus which a user is caused to perceive; and a control unit configured to control output of a tactile stimulus of a second tactile stimulus generation source different from the first tactile stimulus generation source on a basis of the first information and the second information.

In addition, according to the present disclosure, there is provided a control method including, by a processor: obtaining first information regarding a tactile stimulus transferred from a first tactile stimulus generation source and second information regarding a tactile stimulus which a user is caused to perceive; and controlling output of a tactile stimulus of a second tactile stimulus generation source different from the first tactile stimulus generation source on a basis of the first information and the second information.

In addition, according to the present disclosure, there is provided a program causing a computer system to realize: an information acquisition function of obtaining first information regarding a tactile stimulus transferred from a first tactile stimulus generation source and second information regarding a tactile stimulus which a user is caused to perceive; and a control function of controlling output of a tactile stimulus of a second tactile stimulus generation source different from the first tactile stimulus generation source on a basis of the first information and the second information.

Advantageous Effects of Invention

According to the present disclosure, as described, it is possible to provide a structure capable of causing a user to perceive a desired tactile stimulus more reliably. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
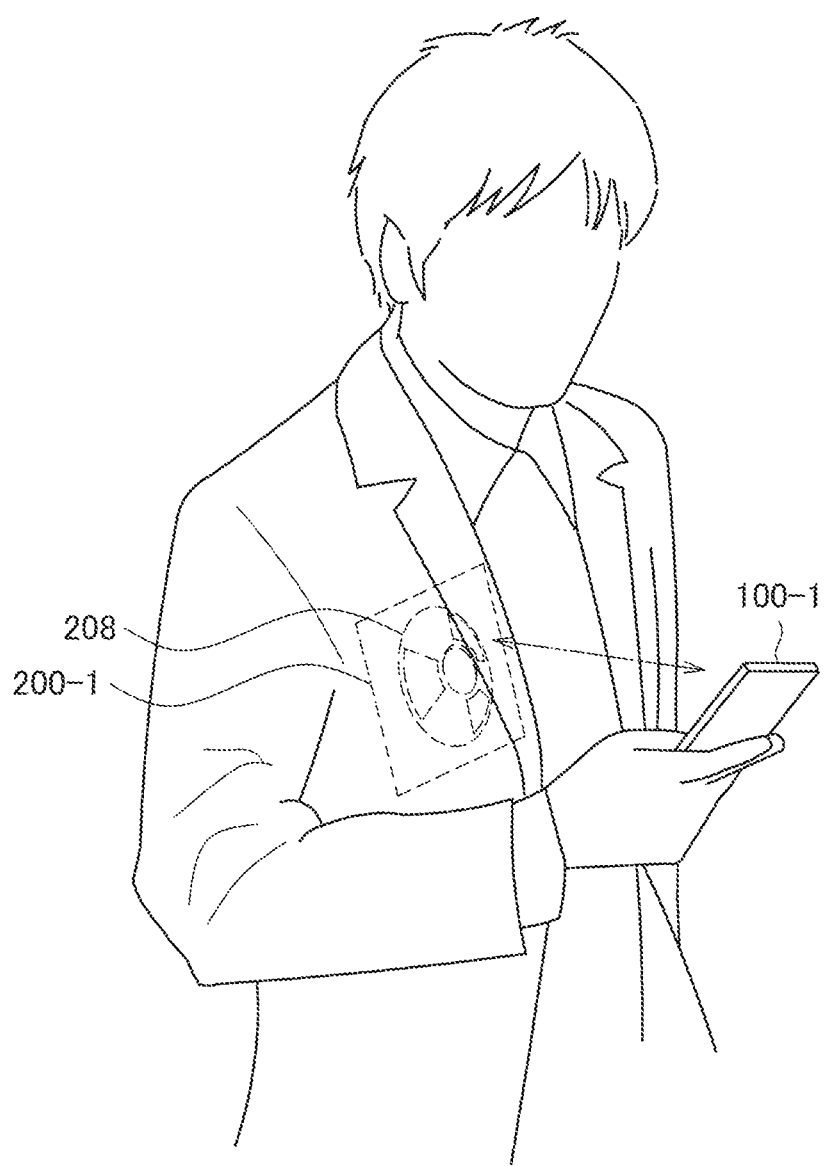
FIG. 1 is an explanatory diagram illustrating an overview of a tactile vibration control system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and the drawings, different numbers are given to the same reference numerals to distinguish a plurality of constituent elements with substantially the same functional configurations from each other in some cases. For example, a plurality of configurations with substantially the same functions are distinguished from each other, as necessary, such as a tactile vibration device 200A and a tactile vibration device 200B. However, in a case in which it is not necessary to distinguish substantially the same functional configurations from each other, only the same reference numerals are given. For example, in a case in which it is not particularly necessary to distinguish the tactile vibration device 200A and the tactile vibration device 200B from each other, the tactile vibration device 200A and the tactile vibration device 200B are merely referred to as the tactile vibration devices 200.

In addition, to facilitate description, tactile vibration control devices 100 according to first to third embodiments are distinguished from each other by suffixing numbers corresponding to the embodiments, such as a tactile vibration control device 100-1 to a tactile vibration control device 100-3. Note that the same applies to tactile vibration devices 200.

Note that the description will be made in the following order.
1. First embodiment (example in which vibration is detected by vibration sensor)
1-1. Overview of system
1-2. Physical configurations of devices
1-3. Logical configurations of devices
1-4. Processes of devices
1-5. Conclusion of first embodiment
1-6. Modification examples
2. Second embodiment (example in which vibration is detected by vibration actuator)
2-1. Logical configuration of device
2-2. Conclusion of second embodiment
2-3. Modification examples
3. Third embodiment (example in which plurality of vibration actuators are used)
3-1. Logical configurations of devices
3-2. Conclusion of third embodiment
3-3. Modification examples
4. Conclusion <1. First Embodiment (Example in Which Vibration is Detected by Vibration Sensor)>

First, a first embodiment of the present disclosure will be described. The tactile vibration control device 100-1 according to the first embodiment controls a vibration form of a tactile vibration device 200-1 on the basis of tactile vibration (hereinafter also simply referred to as vibration) detected by a vibration sensor included in the tactile vibration device 200-1.

<1-1. Overview of System>

An overview of a tactile vibration control system according to the first embodiment of the present disclosure will be described with reference to FIG. 1. FIG. 1 is an explanatory diagram illustrating the overview of the tactile vibration control system according to the first embodiment of the present disclosure.

The tactile vibration control system according to the embodiment includes the tactile vibration control device 100-1 and the tactile vibration device 200-1. The tactile vibration control device 100-1 controls an operation of the tactile vibration device 200-1 through communication. The tactile vibration device 200-1 outputs vibration on the basis of an instruction from the tactile vibration control device 100-1.

For example, the tactile vibration control system according to the embodiment includes the tactile vibration control device 100-1 which is a type of portable terminal such as a smartphone and a tactile vibration device 200-1 attached to clothing of a user, as illustrated in FIG. 1. The tactile vibration control device 100-1 instructs the tactile vibration device 200-1 to output vibration through wireless communication. The tactile vibration device 200-1 causes vibration to a vibration actuator 208, which will be described later, included in the tactile vibration device 200-1 to output vibration in response to the instruction.

Here, with the development of technology related to tactile vibration, tactile vibration with a more realistic sense has come to be preferred. However, as vibration transferred to a user, there is also vibration other than vibration output by the tactile vibration device 200-1. For example, there is vibration generated around the user, vibration generated due to a motion of the user, or the like. In addition, strength of output vibration is also changed in accordance with a contact state between the tactile vibration device 200-1 and the user. For example, the output vibration is weakened or strengthened in accordance with the way the tactile vibration device 200-1 or the like is worn or gripped in some cases.

In addition, tactile vibration to be output propagates to a location other than a desired presentation location in some cases. For example, in a case in which the plurality of tactile vibration devices 200-1 are worn by the user, vibration output by one tactile vibration device 200-1 is transferred to output destination regions of the other tactile vibration devices 200-1. Therefore, desired vibration is not given to only a specific region. As a result, it is difficult to cause the user to perceive the desired vibration.

Accordingly, a tactile vibration control system capable of causing a user to perceive a desired tactile stimulus more reliably is proposed. Hereinafter, each device included in the tactile vibration control system will be described in detail.

<1-2. Physical Configurations of Devices>

Next, a physical configuration of each device according to the first embodiment of the present disclosure will be described.

(Physical Configuration of Tactile Vibration Control Device)

Figure 2:
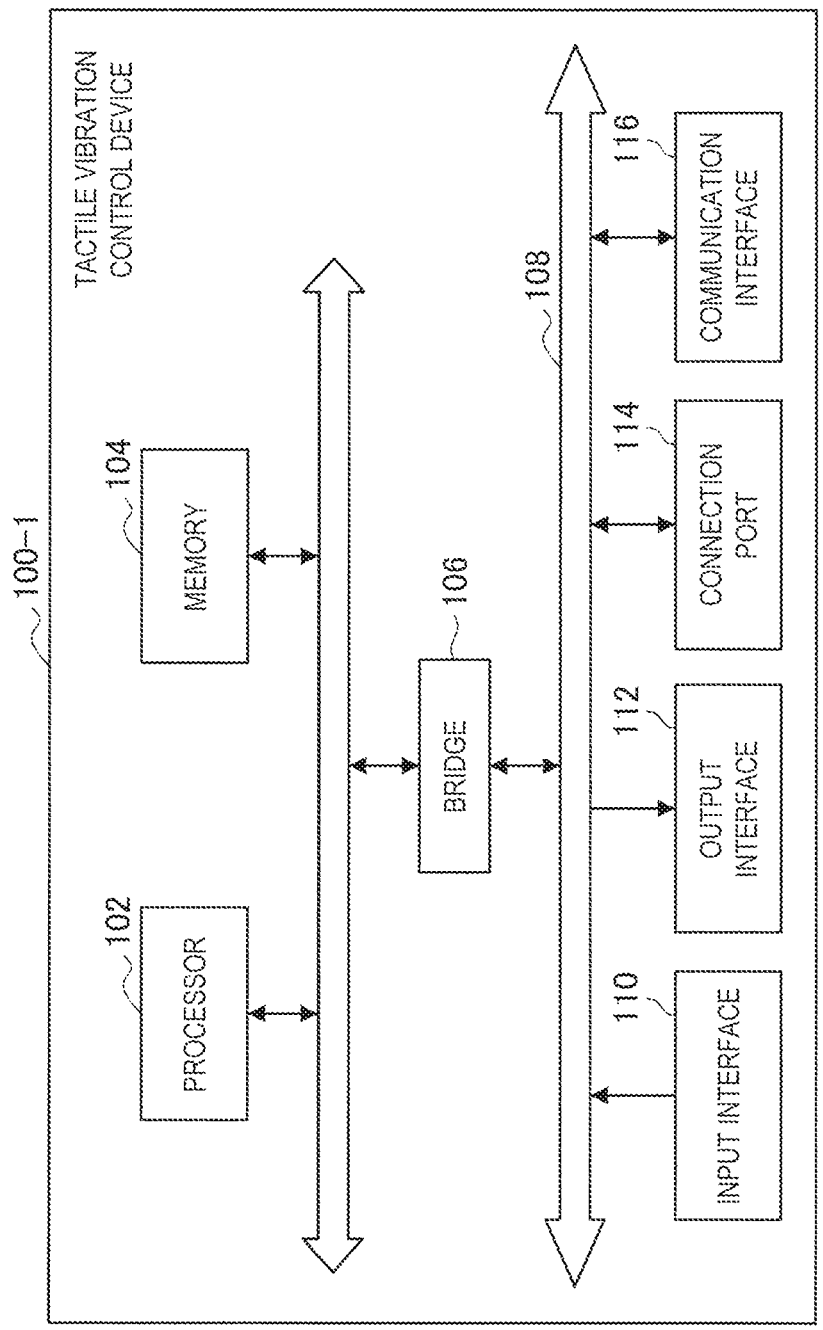
FIG. 2 is a block diagram schematically illustrating a physical configuration example of a tactile vibration control device according to the embodiment.

First, the physical configuration of the tactile vibration control device 100-1 according to the embodiment will be described with reference to FIG. 2. FIG. 2 is a block diagram schematically illustrating a physical configuration example of the tactile vibration control device 100-1 according to the embodiment.

As illustrated in FIG. 2, the tactile vibration control device 100-1 includes a processor 102, a memory 104, a bridge 106, a bus 108, an input interface 110, an output interface 112, a connection port 114, and a communication interface 116.

(Processor)

The processor 102 functions as an arithmetic processing device and realizes a function of a vibration control unit 122 to be described below in the tactile vibration control device 100-1 in cooperation with various programs. The processor 102 causes various logical functions of the tactile vibration control device 100-1 to be described below to operate using a control circuit by executing a program stored in the memory 104 or another storage medium. For example, the processor 102 can be a central processing unit (CPU), a graphics processing unit (GPU), a digital signal processor (DSP), or a system-on-a-chip (SoC).

(Memory)

The memory 104 stores a program, an arithmetic parameter, or the like to be used by the processor 102. For example, the memory 104 includes a random access memory (RAM) and temporarily stores a program to be used in execution of the processor 102 or a parameter or the like appropriately changed in the execution. In addition, the memory 104 includes a read-only memory (ROM) and realizes a function of the storage unit 124 to be described below with a RAM and a ROM. Note that an external storage device may be used as a part of the memory 104 via the connection port 114, the communication interface 116, or the like.

Note that the processor 102 and the memory 104 are connected to each other by an internal bus including a CPU bus or the like.

(Bridge and Bus)

The bridge 106 connects buses to each other. Specifically, the bridge 106 connects an internal bus to which the processor 102 and the memory 104 are connected, to a bus 108 connecting the input interface 110, the output interface 112, the connection port 114, and the communication interface 116 to each other.

(Input Interface)

The input interface 110 is used for the user to manipulate the tactile vibration control device 100-1 and input information to the tactile vibration control device 100-1. For example, the input interface 110 includes input means used for the user to input information, an input control circuit that generates an input signal on the basis of an input by the user and outputs the input signal to the processor 102, and the like. Note that the input means may be a mouse, a keyboard, a touch panel, a switch, a lever, a microphone, or the like. The user of the tactile vibration control device 100-1 can manipulate the input interface 110 to input various kinds of data to the tactile vibration control device 100-1 or give an instruction to execute a process operation.

(Output Interface)

The output interface 112 is used to notify the user of information. For example, the output interface 112 may be a device such as a liquid crystal display (LCD) device, an organic light-emitting diode (OLED) device, a projector, a speaker, or a headphone or may be a module that executes output to the device.

(Connection Port)

The connection port 114 is a port that directly connects a device to the tactile vibration control device 100-1. For example, the connection port 114 can be a Universal Serial Bus (USB) port, an IEEE1394 port, a Small Computer System Interface (SCSI) port, or the like. In addition, the connection port 114 may be an RS-232C port, an optical audio terminal, a High-Definition Multimedia Interface (HDMI: registered trademark) port, or the like. An external device may be connected to the connection port 114 so that data is exchanged between the tactile vibration control device 100-1 and this device.

(Communication Interface)

The communication interface 116 relays communication between the tactile vibration control device 100-1 and an external device to realize a function of a communication unit 126 to be described below. Specifically, the communication interface 116 executes communication in conformity with a wireless communication scheme. For example, the communication interface 116 may execute wireless communication in conformity with any wireless communication scheme such as a short range wireless communication scheme such as Bluetooth (registered trademark), Near Field Communication (NFC), wireless USB, or TransferJet (registered trademark), a cellular communication scheme such as Wideband Code Division Multiple Access (WCDMA: registered trademark), WiMAX (registered trademark), Long Term Evolution (LTE), or LTA-A, or a wireless local area network (LAN) such as Wi-Fi (registered trademark). In addition, the communication interface 116 may execute wired communication such as signal-line communication or wired LAN communication.

(Physical Configuration of Tactile Vibration Device)

Figure 3:
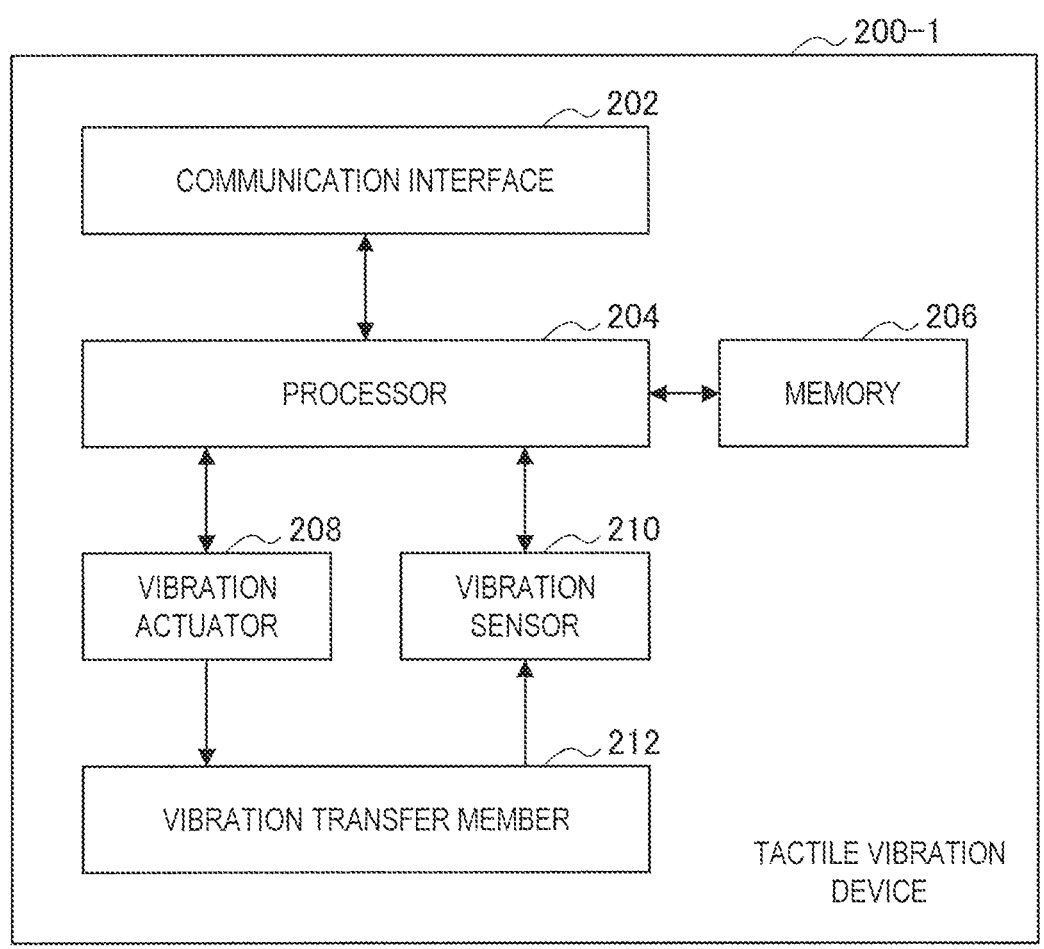
FIG. 3 is a block diagram schematically illustrating a physical configuration example of a tactile vibration device according to the embodiment.

Next, a physical configuration of the tactile vibration device 200-1 according to the embodiment will be described with reference to FIG. 3. FIG. 3 is a block diagram schematically illustrating the physical configuration example of the tactile vibration device 200-1 according to the embodiment.

As illustrated in FIG. 3, the tactile vibration device 200-1 includes a communication interface 202, a processor 204, a memory 206, a vibration actuator 208, a vibration sensor 210, and a vibration transfer member 212.

(Communication Interface)

The communication interface 202 relays communication between the tactile vibration device 200-1 and an external device to realize a function of a communication unit 222 to be described below. Specifically, the communication interface 202 executes communication in conformity with a wireless communication scheme or a wired communication scheme. Note that since the details are substantially the same as those of the above-described communication interface 116, the description thereof will be omitted.

(Processor)

The processor 204 functions as an arithmetic processing device and realizes a function of a signal processing unit 224 to be described below in the tactile vibration device 200-1 in cooperation with various programs. The processor 204 causes various logical functions of the tactile vibration device 200-1 to be described below to operate using a control circuit by executing a program stored in the memory 206 or another storage medium. For example, the processor 204 can be a microprocessor.

(Memory)

The memory 206 stores a program, an arithmetic parameter, or the like to be used by the processor 204. For example, the memory 206 includes a RAM or a ROM and temporarily stores a program to be used in execution of the processor 204 or a parameter or the like appropriately changed in the execution.

(Vibration Actuator)

The vibration actuator 208 serves as a second tactile stimulus generation source or a tactile vibration generation device and realizes a function of a vibration output unit 226 to be described below by outputting tactile vibration. Specifically, the vibration actuator 208 includes at least one motor and causes vibration to be generated by operating a motor in accordance with a signal to be input. For example, the motor can be a motor that executes a rotational movement or a linear reciprocation movement.

(Vibration Sensor)

The vibration sensor 210 serves as a tactile vibration measurement device and realizes a function of a vibration detection unit 228 to be described below by detecting tactile vibration transferred via the vibration transfer member 212. For example, the vibration sensor 210 can be an acceleration sensor, a speed sensor, a displacement sensor, a microphone, or the like. Note that a plurality of kinds of sensors may be combined to be used.

(Vibration Transfer Member)

The vibration transfer member 212 transfers tactile vibration generated outside or inside of the tactile vibration device 200-1. For example, the vibration transfer member 212 can be an exterior or a casing of the tactile vibration device 200-1, but may be another member as long as tactile vibration can be transferred. The vibration transfer member 212 transfers tactile vibration generated outside, such as an object or the like coming into contact with the tactile vibration device 200-1 to the inside and transfers tactile vibration generated internally (for example, tactile vibration output by the vibration actuator 208) to the outside.

<1-3. Logical Configurations of Devices>

Figure 4:
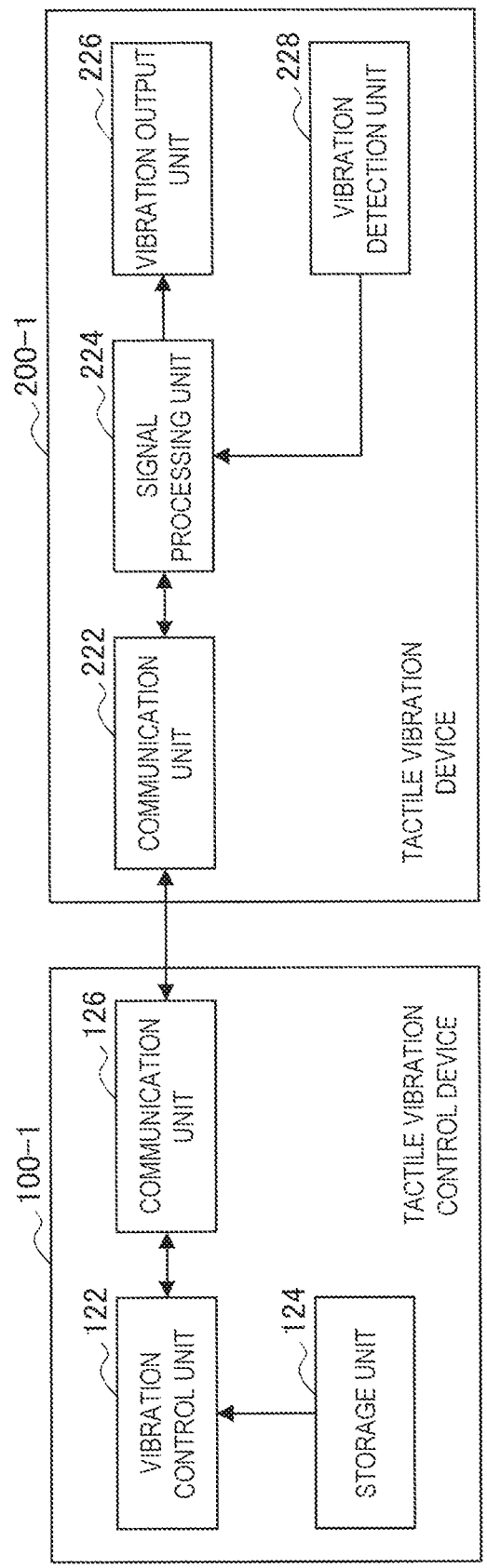
FIG. 4 is a block diagram schematically illustrating logical configuration examples of the tactile vibration control device and the tactile vibration device according to the embodiment.

Next, a logical configuration of each device according to the first embodiment of the present disclosure will be described with reference to FIG. 4. FIG. 4 is a block diagram schematically illustrating logical configuration examples of the tactile vibration control device 100-1 and the tactile vibration device 200-1 according to the embodiment.

(Logical Configuration of Tactile Vibration Control Device)

First, a logical configuration of the tactile vibration control device 100-1 according to the embodiment will be described. As illustrated in FIG. 4, the tactile vibration control device 100-1 includes the vibration control unit 122, the storage unit 124, and the communication unit 126.

(Vibration Control Unit)

The vibration control unit 122 controls a vibration process of the tactile vibration device 200-1. Specifically, the vibration control unit 122 controls presence or absence of vibration or the degree of vibration in the tactile vibration device 200-1. For example, the vibration control unit 122 generates vibration information indicating start, stop, or the degree of vibration output (hereinafter also referred to as output vibration information) and causes the communication unit 126 to transmit the generated output vibration information to the tactile vibration device 200-1.

Figure 5:
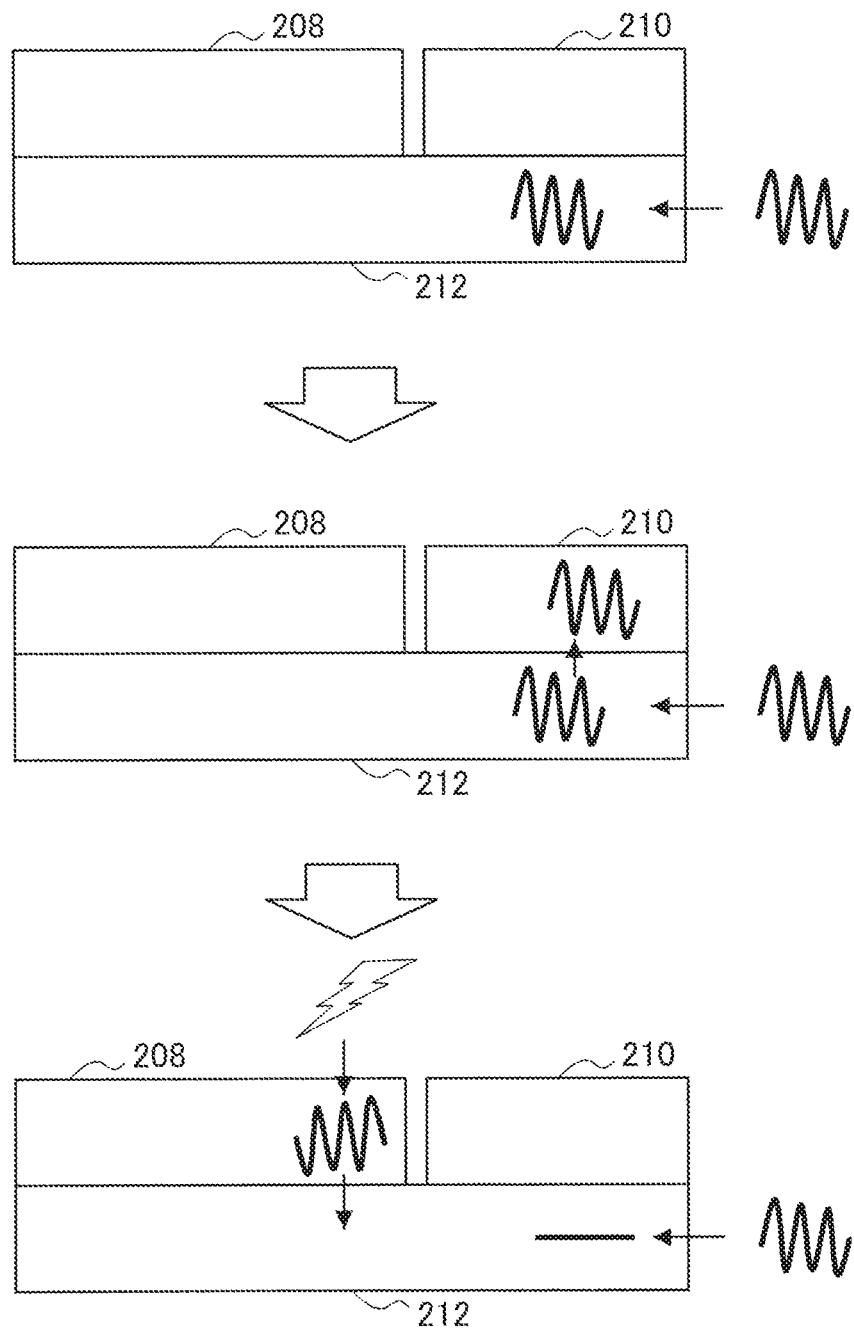
FIG. 5 is an explanatory diagram illustrating an example in which noise vibration is suppressed in a case in which vibration is not output in the tactile vibration device according to the embodiment.
Figure 6:
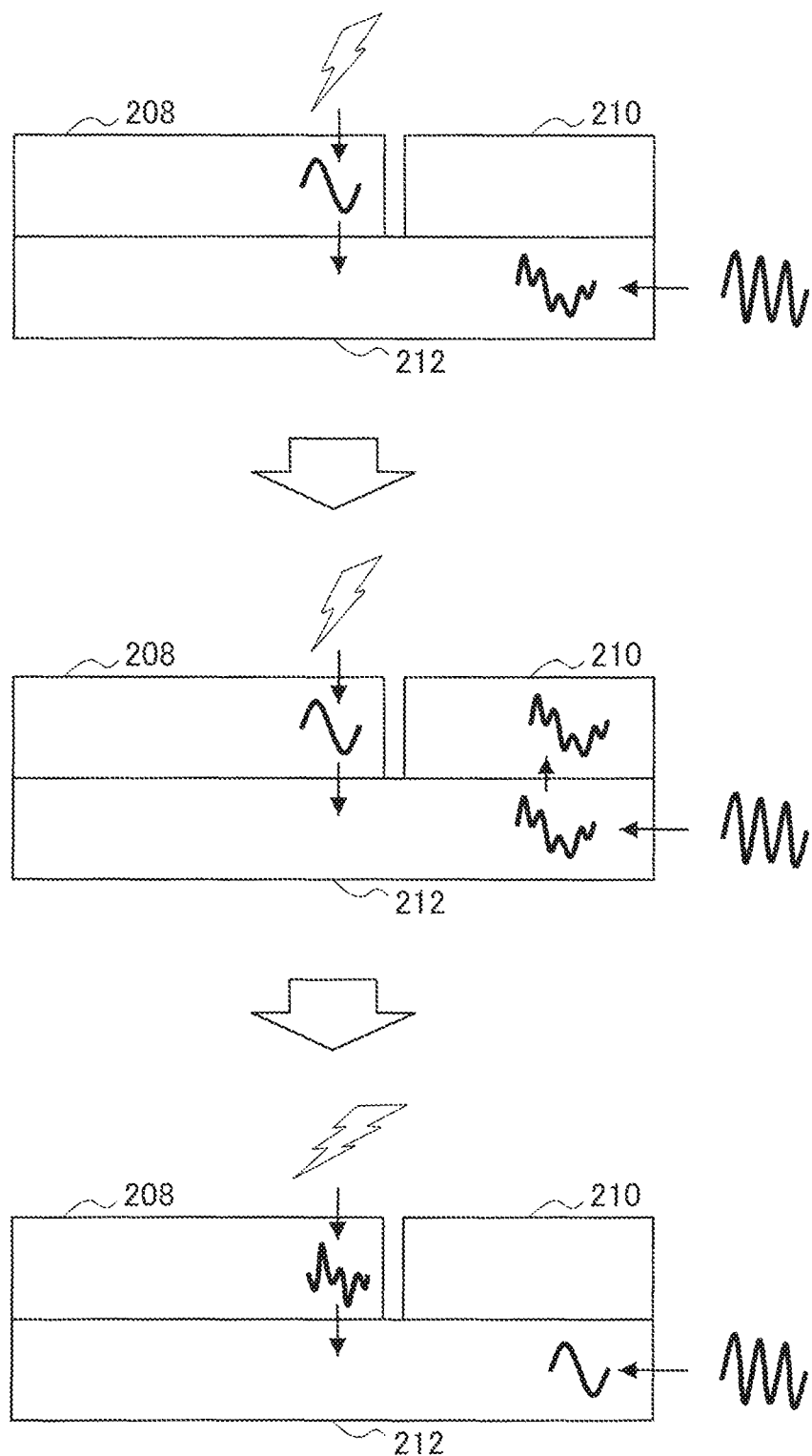
FIG. 6 is an explanatory diagram illustrating an example in which noise vibration is suppressed in a case in which vibration is output in the tactile vibration device according to the embodiment.

In addition, the vibration control unit 122 controls a vibration process on the basis of tactile vibration detected as first tactile vibration (hereinafter also referred to as detection vibration). Specifically, the vibration control unit 122 controls a form of tactile vibration (hereinafter also referred to as noise suppression vibration) suppressing tactile vibration (hereinafter also referred to as noise vibration) other than tactile vibration which the user is caused to perceive (hereinafter also referred to as target vibration) in detection vibration on the basis of vibration information regarding the detection vibration (hereinafter also referred to as detection vibration information). For example, the detection vibration is detected by the vibration sensor 210 of the tactile vibration device 200-1. Note that herein, the target vibration also includes a stop state in which vibration is not generated. Further, an example in which noise vibration is suppressed in a process of the vibration control unit 122 will be described with reference to FIGS. 5 and 6. FIG. 5 is an explanatory diagram illustrating an example in which noise vibration is suppressed in a case in which vibration is not output in the tactile vibration device 200-1 according to the embodiment. FIG. 6 is an explanatory diagram illustrating an example in which noise vibration is suppressed in a case in which vibration is output in the tactile vibration device 200-1 according to the embodiment.

First, an example in which noise vibration is suppressed in a case in which vibration is not output in the tactile vibration device 200-1 will be described with reference to FIG. 5.

The vibration control unit 122 acquires detection vibration information regarding vibration detected in the tactile vibration device 200-1 through communication. For example, as illustrated in the upper drawing and the middle drawing of FIG. 5, when vibration is generated outside of the tactile vibration device 200-1, the generated vibration is transferred to the vibration sensor 210 via the vibration transfer member 212. The transferred vibration is detected by the vibration sensor 210 and detection vibration information regarding the detected vibration is transmitted from the tactile vibration device 200-1 to the tactile vibration control device 100-1. Then, the vibration control unit 122 acquires the received detection vibration information. Note that in this case, since vibration is not output from the vibration actuator 208, only vibration generated outside of the tactile vibration device 200-1 is detected.

Subsequently, the vibration control unit 122 generates vibration information regarding noise suppression vibration (hereinafter also referred to as noise suppression vibration information) on the basis of the acquired detection vibration information. For example, when the detection vibration information is acquired, the vibration control unit 122 first determines whether the tactile vibration device 200-1 outputs vibration. When the vibration control unit 122 determines that the vibration is not output, the vibration control unit 122 considers the detection vibration is noise vibration and analyzes the detection vibration on the basis of the acquired detection vibration information. Specifically, a frequency, amplitude, and the like of the detection vibration are analyzed. Then, the vibration control unit 122 generates noise suppression vibration information regarding the noise suppression vibration suppressing the detection vibration on the basis of an analysis result of the detection vibration. Specifically, the noise suppression vibration can have the same frequency and amplitude as the detection vibration and have a reverse phase to the detection vibration.

Subsequently, the vibration control unit 122 supplies the generated noise suppression vibration information as output vibration information to the tactile vibration device 200-1 through communication. For example, the vibration control unit 122 causes the communication unit 126 to transmit the generated noise suppression vibration information as the output vibration information to the tactile vibration device 200-1. Then, in the tactile vibration device 200-1, vibration based on the noise suppression vibration information is output and, as illustrated in the lower drawing of FIG. 5, the noise vibration (the detection vibration) is suppressed in the vibration transfer member 212.

Next, an example in which noise vibration is suppressed in a case in which vibration is output in the tactile vibration device 200-1 will be described with reference to FIG. 6. Note that description of content which is substantially the same as the content described with reference to FIG. 5 will be omitted.

The vibration control unit 122 acquires the detection vibration information regarding the vibration detected in the tactile vibration device 200-1 through communication. For example, as illustrated in the upper drawing and the middle drawing of FIG. 6, when vibration is generated outside of the tactile vibration device 200-1 while vibration is output by the vibration actuator 208, composite vibration of the output vibration and the generated vibration is transferred to the vibration sensor 210 via the vibration transfer member 212. The transferred vibration is detected by the vibration sensor 210 and the detection vibration information regarding the detected vibration is acquired by the vibration control unit 122 through communication.

Subsequently, the vibration control unit 122 generates noise suppression vibration information on the basis of the acquired detection vibration information and vibration information regarding target vibration (hereinafter also referred to as target vibration information). For example, when the detection vibration information is acquired, the vibration control unit 122 first determines whether the tactile vibration device 200-1 is outputting vibration. When the vibration control unit 122 determines that the vibration is output, the vibration control unit 122 ascertains noise vibration from the detection vibration on the basis of the detection vibration information and the target vibration information. Subsequently, the vibration control unit 122 analyzes the ascertained noise vibration and generates noise suppression vibration information regarding the noise suppression vibration suppressing the noise vibration on the basis of the analysis result.

Subsequently, the vibration control unit 122 generates output vibration information on the basis of the generated noise suppression vibration information and the target vibration information and supplies the generated output vibration information to the tactile vibration device 200-1 through communication. For example, the vibration control unit 122 generates vibration information regarding the composite vibration of the noise suppression vibration and the target vibration and causes the communication unit 126 to transmit the generated vibration information as output vibration information to the tactile vibration device 200-1. Then, vibration based on the output vibration information is output in the tactile vibration device 200-1, and only noise vibration (vibration generated outside) is suppressed in the vibration transfer member 212. As a result, as illustrated in the lower drawing of FIG. 6, only the target vibration is perceived with the vibration transfer member 212.

(Storage Unit)

The storage unit 124 stores information to be used for a process of the vibration control unit 122. Specifically, the storage unit 124 stores various kinds of vibration information and information or the like indicating an operation state of the tactile vibration device 200-1. For example, the information indicating the operation state of the tactile vibration device 200-1 may be information indicating whether vibration is output or the degree of vibration to be output.

(Communication Unit)

The communication unit 126 serves as an information acquisition unit and communicates with the tactile vibration device 200-1. Specifically, the communication unit 126 transmits output vibration information to the tactile vibration device 200-1 and receives detection vibration information from the tactile vibration device 200-1. Note that a communication scheme executed by the communication unit 126 is assumed to be a wireless communication scheme, but may be wired communication scheme.

(Logical Configuration of Tactile Vibration Device)

Next, a logical configuration of the tactile vibration device 200-1 according to the embodiment will be described. As illustrated in FIG. 4, the tactile vibration device 200-1 includes a communication unit 222, the signal processing unit 224, the vibration output unit 226, and the vibration detection unit 228.

(Communication Unit)

The communication unit 222 communicates with the tactile vibration control device 100-1. Specifically, the communication unit 222 receives output vibration information from the tactile vibration control device 100-1 and transmits detection vibration information to the tactile vibration control device 100-1.

(Signal Processing Unit)

The signal processing unit 224 generates an input signal to be input signal to the vibration output unit 226 on the basis of the output vibration information. Specifically, when the received output vibration information is supplied from the communication unit 222, the signal processing unit 224 generates a signal in accordance with a waveform of vibration to be caused to be output from the vibration output unit 226 from the output vibration information. Then, the signal processing unit 224 inputs the generated signal to the vibration output unit 226.

In addition, the signal processing unit 224 generates detection vibration information on the basis of a signal obtained from the vibration detection unit 228. Specifically, when a signal in accordance with the vibration detected by the vibration detection unit 228 is input, the signal processing unit 224 generates the detection vibration information regarding the input signal. Then, the signal processing unit 224 causes the communication unit 222 to transmit the generated detection vibration information.

(Vibration Output Unit)

The vibration output unit 226 outputs vibration in accordance with the input signal. Specifically, when the signal is input from the signal processing unit 224, the vibration output unit 226 outputs vibration with a waveform in accordance with the input signal. Note that the output vibration is transferred to the outside of the tactile vibration device 200-1, for example, a user or another object, via the vibration transfer member 212.

(Vibration Detection Unit)

The vibration detection unit 228 detects the vibration transferred from the vibration transfer member 212. Specifically, when the vibration is transferred from the vibration transfer member 212, the vibration detection unit 228 generates a signal with a waveform in accordance with the transferred vibration. Then, the generated signal is input to the signal processing unit 224. For example, a first tactile stimulus generation source of the transferred vibration is vibration generated by another process (a sound output process, a device cooling process, or the like) of the tactile vibration device 200-1, vibration generated due to a behavior (walking or the like) of the user carrying the tactile vibration device 200-1, vibration output by an external tactile vibration generation device, or the like.

<1-4. Processes of Devices>

Figure 7:
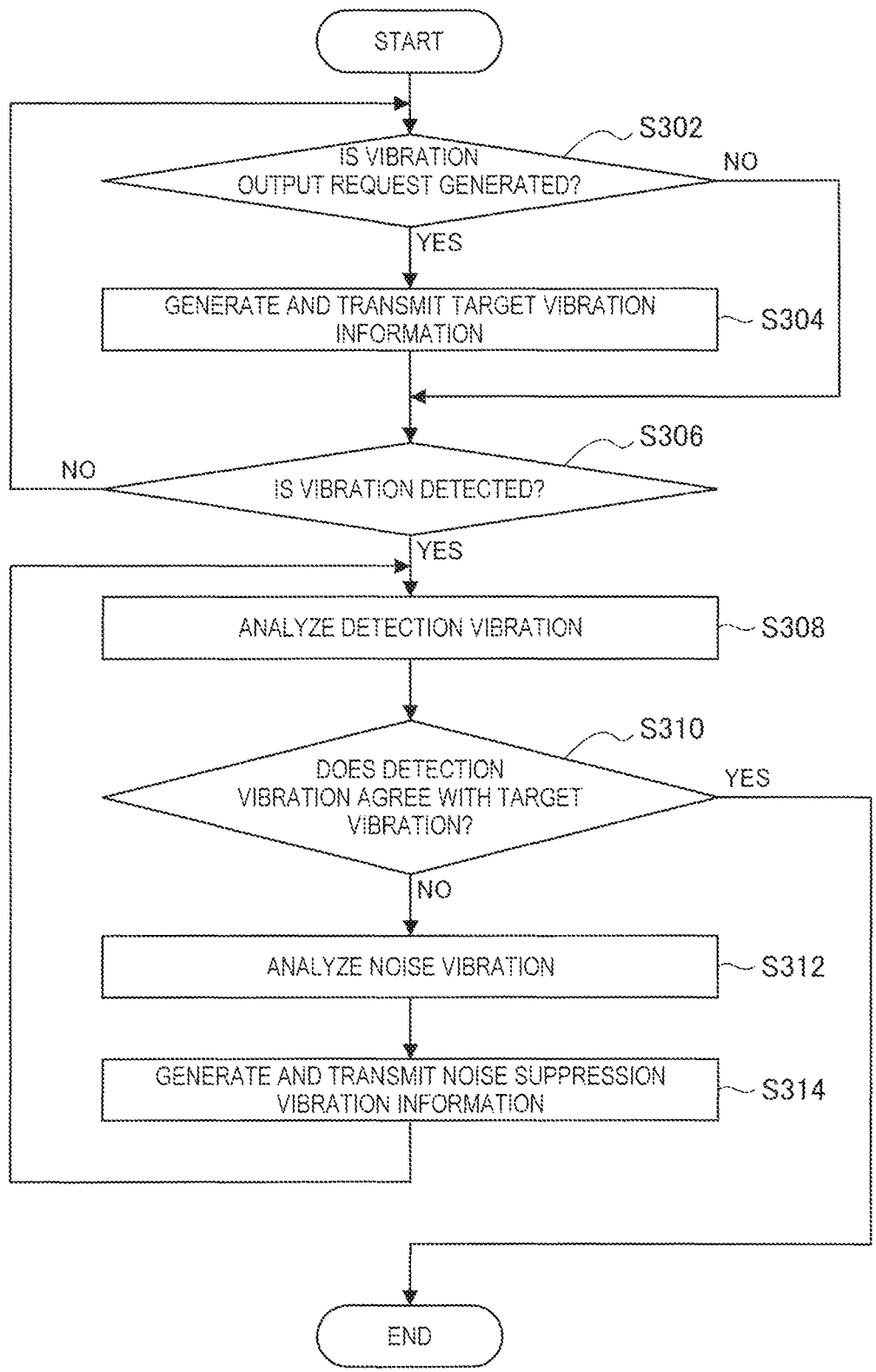
FIG. 7 is a flowchart conceptually illustrating a processing example of the tactile vibration control device according to the embodiment.

Next, a process of the tactile vibration control device 100-1 according to the embodiment will be described with reference to FIG. 7. FIG. 7 is a flowchart conceptually illustrating a processing example of the tactile vibration control device 100-1 according to the embodiment.

The tactile vibration control device 100-1 determines whether a vibration output request is generated (step S302). Specifically, the vibration control unit 122 determines whether a vibration output request is notified of by another function in the tactile vibration control device 100-1 or an external device.

When it is determined that the vibration output request is generated, the tactile vibration control device 100-1 generates the target vibration information and transmits the target vibration information to the tactile vibration device 200-1 (step S304). Specifically, when the vibration control unit 122 determines that the vibration output request is notified of, the vibration control unit 122 generates the target vibration information on the basis of the vibration output request. Then, the vibration control unit 122 causes the communication unit 126 to transmit the generated target vibration information as output vibration information to the tactile vibration device 200-1.

Subsequently, the tactile vibration control device 100-1 determines whether the vibration is detected (step S306). Specifically, the vibration control unit 122 determines whether the detection vibration information is received from the tactile vibration device 200-1.

When it is determined that the vibration is detected, the tactile vibration control device 100-1 analyzes the detection vibration (step S308). Specifically, when it is determined that the detection vibration information is received from the tactile vibration device 200-1, the vibration control unit 122 analyzes features such as a frequency, amplitude, and the like of the detection vibration on the basis of the detection vibration information.

Subsequently, the tactile vibration control device 100-1 determines whether the detection vibration agrees with the target vibration (step S310). Specifically, the vibration control unit 122 determines whether the features of the detection vibration agree with features of the target vibration, that is, the frequency and the amplitude agree with one another, on the basis of an analysis result of the detection vibration. In other words, the vibration control unit 122 determines whether noise vibration is included in the detection vibration. Note that a divergence of the agreement of the features may be permitted within a predetermined range.

When it is determined that the detection vibration does not agree with the target vibration, the tactile vibration control device 100-1 analyzes the noise vibration (step S312). Specifically, when the vibration control unit 122 determines that the noise vibration is included in the detection vibration, the vibration control unit 122 ascertains the noise vibration on the basis of the detection vibration and the target vibration. For example, the noise vibration may be ascertained by subtracting the target vibration from the detection vibration. Then, the vibration control unit 122 analyzes the features of the ascertained noise vibration.

Subsequently, the tactile vibration control device 100-1 generates the noise suppression vibration information and transmits the noise suppression vibration information to the tactile vibration device 200-1 (step S314). Specifically, the vibration control unit 122 generates the noise suppression vibration information related to the noise suppression vibration with a reverse phase to the noise signal on the basis of the analysis result of the noise vibration. Then, the vibration control unit 122 causes the communication unit 126 to transmit the generated noise suppression vibration information as output vibration information to the tactile vibration device 200-1.

Conversely, when it is determined that the detection vibration agrees with the target vibration, the tactile vibration control device 100-1 ends the process.

<1-5. Conclusion of First Embodiment>

In this way, according to the first embodiment of the present disclosure, the tactile vibration control device 100-1 obtains first information related to a tactile stimulus transferred from the first tactile stimulus generation source and second information related to a tactile stimulus which the user is caused to perceive. Then, the tactile vibration control device 100-1 controls output of a tactile stimulus of a second tactile stimulus generation source different from the first tactile stimulus generation source on the basis of the first information and the second information. Therefore, by causing the second tactile stimulus generation source to output a tactile stimulus causing the user to perceive only a desired tactile stimulus, the user can be caused to perceive the desired tactile stimulus more reliably.

In addition, the tactile stimulus includes tactile vibration. The tactile vibration control device 100-1 controls output of third tactile vibration (noise suppression vibration) suppressing tactile vibration (noise vibration) other than second tactile vibration (target vibration) related to the second information in first tactile vibration (detection vibration) related to the first information (detection vibration information) with regard to the second tactile stimulus generation source. Therefore, the user can be caused not to perceive noise vibration while maintaining the target vibration. Accordingly, desired tactile vibration can be caused to be accentuated, and thus the user can be caused to more reliably perceive the desired tactile vibration. In addition, therefore, it is possible to achieve smooth information transfer by the tactile vibration. Further, by controlling the noise suppression vibration on the basis of information regarding the detected vibration, it is possible to improve the agreement of the noise suppression vibration with the noise vibration. Accordingly, it is possible to realize a vibration state in which the noise vibration is smaller.

In addition, the detection vibration is detected by a tactile vibration measurement device. Therefore, by detecting the vibration more precisely, it is possible to further improve the agreement of the noise suppression vibration with the noise vibration. Accordingly, the user can be caused to perceive vibration with less noise vibration.

In addition, the tactile vibration control device 100-1 causes the vibration output unit 226 (the tactile vibration device 200-1) to output the target vibration. Therefore, since the tactile vibration control device 100-1 controls the generation of the target vibration, it is easy to obtain the target vibration information. Accordingly, even in a case in which the target vibration information is changed, it is possible to suppress generation of the noise suppression vibration information erroneous due to deviation in a timing at which the target vibration information is obtained. As a result, it is possible to reduce concern of the user feeling discomfort or unpleasantness. In addition, in this configuration, it is possible to execute a feedback process on the target vibration to be described below.

<1-6. Modification Examples>

The first embodiment of the present disclosure has been described above. Note that the embodiment is not limited to the foregoing example. Hereinafter, first to third modification examples of the embodiment will be described.

(First Modification Example)

According to a first modification example of the embodiment, a form of noise suppression vibration may be controlled on the basis of vibration information (hereinafter also referred to as predicted vibration information) regarding tactile vibration that is estimated to be generated (hereinafter also referred to as predicted vibration) instead or in addition to detection vibration. Specifically, when the predicted vibration information is acquired, the vibration control unit 122 generates noise suppression vibration information on the basis of the predicted vibration information and target vibration information. Note that a process of generating noise suppression vibration information is substantially the same as that of the case of the detection vibration information. The predicted vibration information is acquired from another function in the tactile vibration control device 100-1 or an external device. For example, the predicted vibration information may be information indicating a vibration output request or information regarding a process in which there is concern of vibration of sound output, activation of a fan, or the like being generated. Note that in a case in which vibration is not output from the tactile vibration device 200-1, predicted vibration is processed as noise vibration like the detection vibration.

In this way, according to the first modification example of the embodiment, the tactile vibration control device 100-1 controls a form of the noise suppression vibration on the basis of the predicted vibration information. Therefore, before vibration is actually detected, the noise suppression vibration can be controlled. Accordingly, it is possible to reduce deviation between a timing at which vibration is actually transferred to the vibration transfer member 212 and a timing at which the noise suppression vibration is generated. In particular, since it takes a time to stabilize vibration output in the vibration actuator 208 in some cases, the configuration is meaningful in this case.

In addition, according to the configuration, even in a case in which vibration is not detected, it is possible to control the noise suppression vibration. For example, even in a case in which vibration is not detected due to breakdown or the like of the vibration sensor 210, it is possible to suppress the noise vibration other than the target vibration.

(Second Modification Example)

Figure 8:
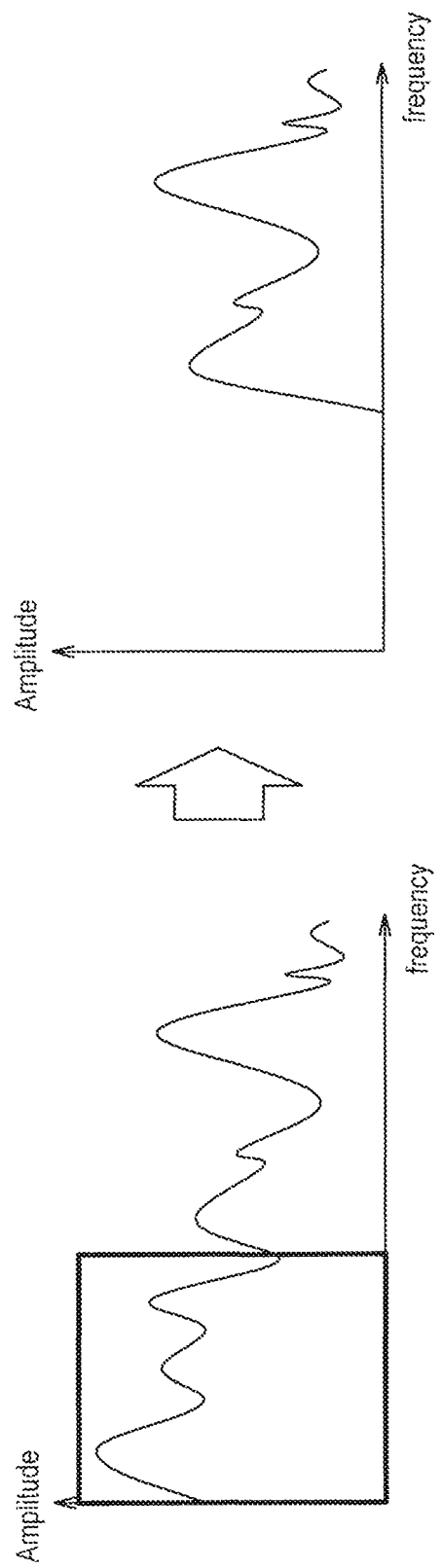
FIG. 8 is a diagram illustrating an example in which vibration with a predetermined frequency in noise vibration is suppressed in response to a process of the tactile vibration control device according to a first modification example of the embodiment.
Figure 9:
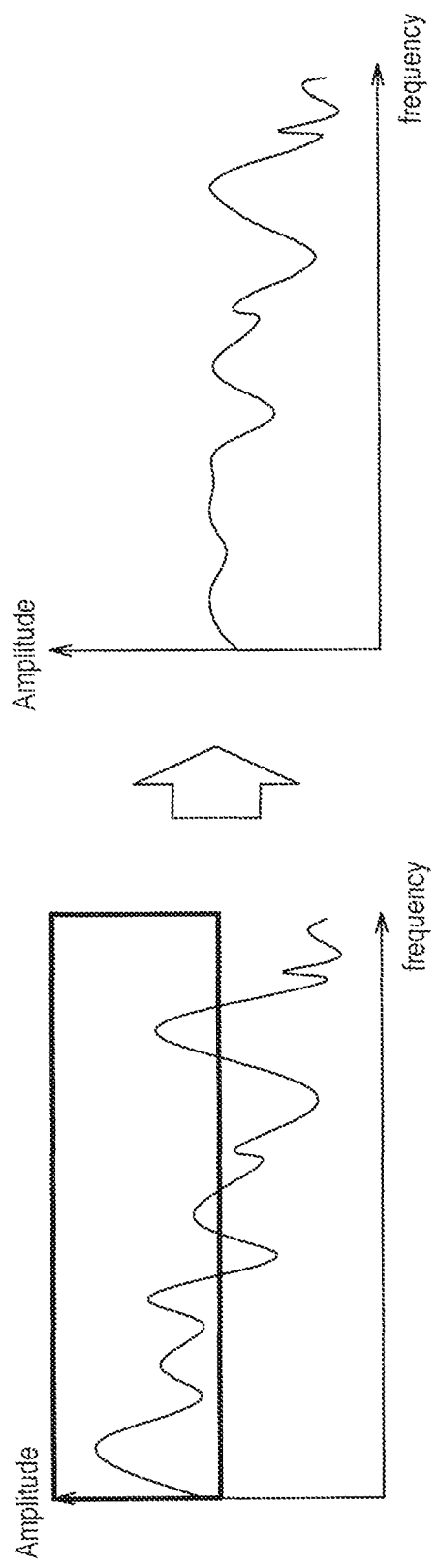
FIG. 9 is a diagram illustrating an example in which vibration with predetermined amplitude in noise vibration is suppressed in response to a process of the tactile vibration control device according to the first modification example of the embodiment.

According to a second modification example of the embodiment, the tactile vibration control device 100-1 may suppress a part of the noise vibration. Specifically, the noise suppression vibration is tactile vibration suppressing tactile vibration with a specific frequency or amplitude in the noise vibration. Further, a process according to the modification example will be described with reference to FIGS. 8 and 9. FIG. 8 is a diagram illustrating an example in which vibration with a predetermined frequency in noise vibration is suppressed in response to a process of the tactile vibration control device 100-1 according to the first modification example of the embodiment. FIG. 9 is a diagram illustrating an example in which vibration with predetermined amplitude in noise vibration is suppressed in response to a process of the tactile vibration control device 100-1 according to the first modification example of the embodiment.

First, an example in which vibration with a predetermined frequency in the noise vibration is suppressed will be described with reference to FIG. 8.

The vibration control unit 122 generates noise suppression vibration information regarding the noise suppression vibration in which vibration with a frequency in a predetermined range of the noise vibration is suppressed. For example, a graph of FIG. 8 shows noise vibration. The vibration control unit 122 causes the tactile vibration device 200-1 to output noise suppression vibration with a reverse phase to the vibration with a frequency in a range equivalent to a portion surrounded by a bold line in the left drawing of FIG. 8. As a result, as illustrating the right drawing of FIG. 8, only noise vibration with the frequency in the range is suppressed.

Next, an example in which vibration with predetermined amplitude in noise vibration is suppressed will be described with reference to FIG. 9.

The vibration control unit 122 generates noise suppression vibration information regarding the noise suppression vibration in which vibration with amplitude in a predetermined range of the noise vibration is suppressed. For example, a graph of FIG. 9 shows noise vibration like FIG. 8. The vibration control unit 122 causes the tactile vibration device 200-1 to output noise suppression vibration with a reverse phase to the vibration with amplitude in a range equivalent to a portion surrounded by a bold line in the left drawing of FIG. 9. As a result, as illustrating the right drawing of FIG. 9, only noise vibration with the amplitude in the range is suppressed.

Note that the frequency or amplitude of the tactile vibration to be suppressed may be decided on the basis of a frequency or amplitude of the target vibration. For example, the vibration control unit 122 may cause the tactile vibration device 200-1 to output noise suppression vibration in which noise vibration with a frequency or amplitude included in a predetermined range is suppressed using the frequency or amplitude of the target vibration as a reference. In addition, the predetermined range of the frequency or amplitude may be set in advance by the user or may be changed ex post facto. In addition, only noise vibration included in both the frequency of the predetermined range and the amplitude of the predetermined range may be suppressed.

In this way, according to the second modification example of the embodiment, the noise suppression vibration includes tactile vibration suppressing the tactile vibration with the specific frequency or amplitude in the noise vibration other than the target vibration. Therefore, by outputting the noise suppression vibration suppressing only a part of the noise vibration, it is possible to reduce processing loads of the tactile vibration control device 100-1 and the tactile vibration device 200-1. Accordingly, it is possible to improve responsiveness to the suppression of the noise vibration.

In addition, the specific frequency or amplitude is decided on the basis of the frequency or amplitude of the target vibration. Therefore, for example, by suppressing the noise vibration with a frequency or amplitude close to the frequency or the amplitude of the target vibration, it is possible to emphasize the target vibration. Accordingly, the user can be caused to perceive the target vibration effectively while reducing the processing load.

(Third Modification Example)

According to a third modification example of the embodiment, the tactile vibration control device 100-1 may control the form of the noise suppression vibration on the basis of another piece of information in addition to the detection information. Specifically, the vibration control unit 122 controls a form of noise suppression vibration on the basis of information regarding an environment around a user. More specifically, the vibration control unit 122 controls a form of noise suppression vibration on the basis of information indicating the magnitude of a sound generated around the user. For example, in a case in which a sound pressure around the user is equal to or greater than a threshold, the vibration control unit 122 causes the tactile vibration device 200-1 not to output the noise suppression vibration. Conversely, in a case in which the sound pressure around the user is less than the threshold, the vibration control unit 122 causes the tactile vibration device 200-1 to output the noise suppression vibration. This is because in a case in which a sound pressure of a heard sound is high, human perception of tactile vibration further deteriorates than in a case in which the sound pressure is low. Further, in a case in which the sound pressure around the user is less than the threshold, a frequency or amplitude of vibration to be suppressed may be expanded when only a part of the noise vibration is suppressed.

In addition, the vibration control unit 122 may control the form of the noise suppression vibration on the basis of information regarding a behavior of the user. Specifically, the vibration control unit 122 controls the form of the noise suppression vibration on the basis of information indicating a movement form of the user. For example, while the user is moving, the vibration control unit 122 causes the tactile vibration device 200-1 to output the noise suppression vibration. In addition, while the user is stopping, the vibration control unit 122 causes the tactile vibration device 200-1 not to output the noise suppression vibration. This is because since tactile vibration received by a human body is greater during movement than in a stopping state, perception of tactile vibration to be output deteriorates.

In addition, the vibration control unit 122 may control the form of the noise suppression vibration on the basis of information regarding a nature or a form of a transfer unit to which tactile vibration is transferred. Specifically, the vibration control unit 122 controls the form of the noise suppression vibration on the basis of information regarding a nature or a form of an object coming into contact with the vibration transfer member 212 or the tactile vibration device 200-1. For example, the vibration control unit 122 controls presence or absence of vibration or the degree of noise suppression vibration on the basis of information indicating a material, an eigenfrequency, a shape, a texture, a substance state (a solid, a liquid, a gas, or the like), or the like of an object coming into contact with the vibration transfer member 212 or the tactile vibration device 200-1. This is because tactile vibration output in accordance with a nature or a form of an output destination of tactile vibration is generally attenuated or amplified.

In this way, according to the third modification example of the embodiment, the tactile vibration control device 100-1 controls the form of the noise suppression vibration on the basis of the information regarding the environment around the user. Therefore, by actively suppressing the noise vibration in an environment in which it is easy for the user to perceive tactile vibration, the user can be cause to perceive the target vibration effectively. In contrast, by stopping suppression of the noise vibration or inactively suppressing the noise vibration in an environment in which it is difficult for the user to perceive tactile vibration, it is possible to reduce processing loads or power consumption of the tactile vibration control device 100-1 and the tactile vibration device 200-1.

In addition, the tactile vibration control device 100-1 controls the form of the noise suppression vibration on the basis of information regarding a behavior of the user. Therefore, by actively suppressing the noise vibration while the user is executing a behavior in which it is easy to perceive tactile vibration, the user can be caused to perceive the target vibration effectively. In contrast, by stopping suppression of the noise vibration or inactively suppressing the noise vibration in an environment in which the user is executing a behavior in which it is difficult to perceive tactile vibration, it is possible to reduce processing loads or power consumption of the tactile vibration control device 100-1 and the tactile vibration device 200-1.

In addition, the tactile vibration control device 100-1 controls the form of the noise suppression vibration on the basis of information regarding a nature or a form of a transfer unit to which vibration is transferred. Therefore, in a case in which it is easy to transfer the tactile vibration, the user can be caused to perceive the target vibration effectively by actively suppressing the noise vibration. In contrast, in a case in which it is difficult to transfer the tactile vibration, it is possible to reduce processing loads or power consumption of the tactile vibration control device 100-1 and the tactile vibration device 200-1 by stopping suppression of the noise vibration or inactively suppressing the noise vibration.

<2. Second Embodiment (Example in Which Vibration is Detected by Vibration Actuator)>

The first embodiment of the present disclosure has been described above. Next, a second embodiment of the present disclosure will be described. A tactile vibration control device 100-2 according to the second embodiment also has the function of the tactile vibration device 200-1. In addition, the tactile vibration control device 100-2 detects vibration using the vibration actuator 208. Note that since a physical configuration of the tactile vibration control device 100-2 is substantially the same a combination of the configurations of the tactile vibration control device 100-1 and the tactile vibration device 200-1, the description thereof will be omitted.

<2-1. Logical Configuration of Device>

Figure 10:
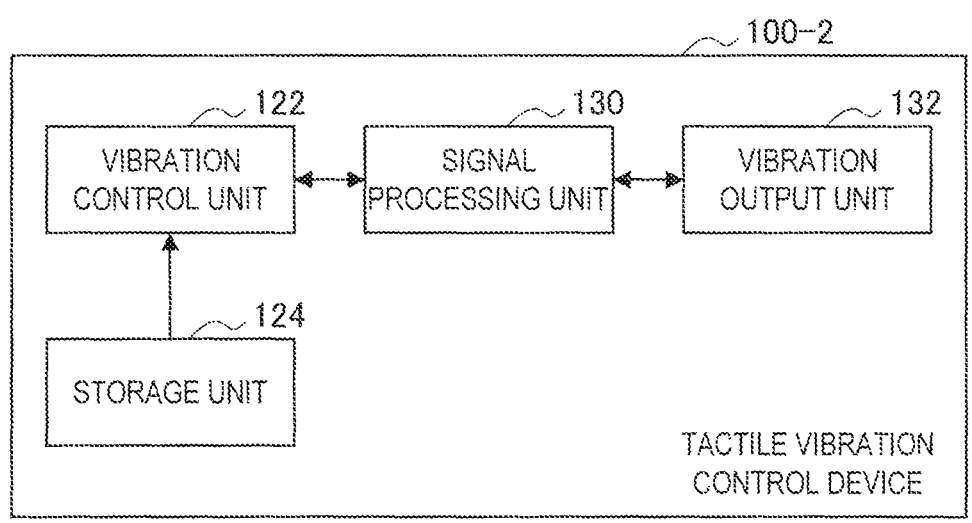
FIG. 10 is a block diagram conceptually illustrating a logical configuration example of a tactile vibration control device according to a second embodiment of the present disclosure.

A logical configuration of the tactile vibration control device 100-2 according to the second embodiment of the present disclosure will be described with reference to FIG. 10. FIG. 10 is a block diagram conceptually illustrating the logical configuration example of the tactile vibration control device 100-2 according to the second embodiment of the present disclosure.

As illustrated in FIG. 10, the tactile vibration control device 100-2 includes a signal processing unit 130 and a vibration output unit 132 in addition to the vibration control unit 122 and the storage unit 124. Note that the description of the functions which are substantially the same as the functions in the first embodiment will be omitted.

(Signal Processing Unit)

The signal processing unit 130 generates an input signal to be input to the vibration output unit 132 on the basis of output vibration information. Note that since a process of generating the input signal to be input to the vibration output unit 132 of the signal processing unit 130 is substantially the same as the process of the signal processing unit 224 according to the first embodiment, the description thereof will be omitted.

Figure 11:
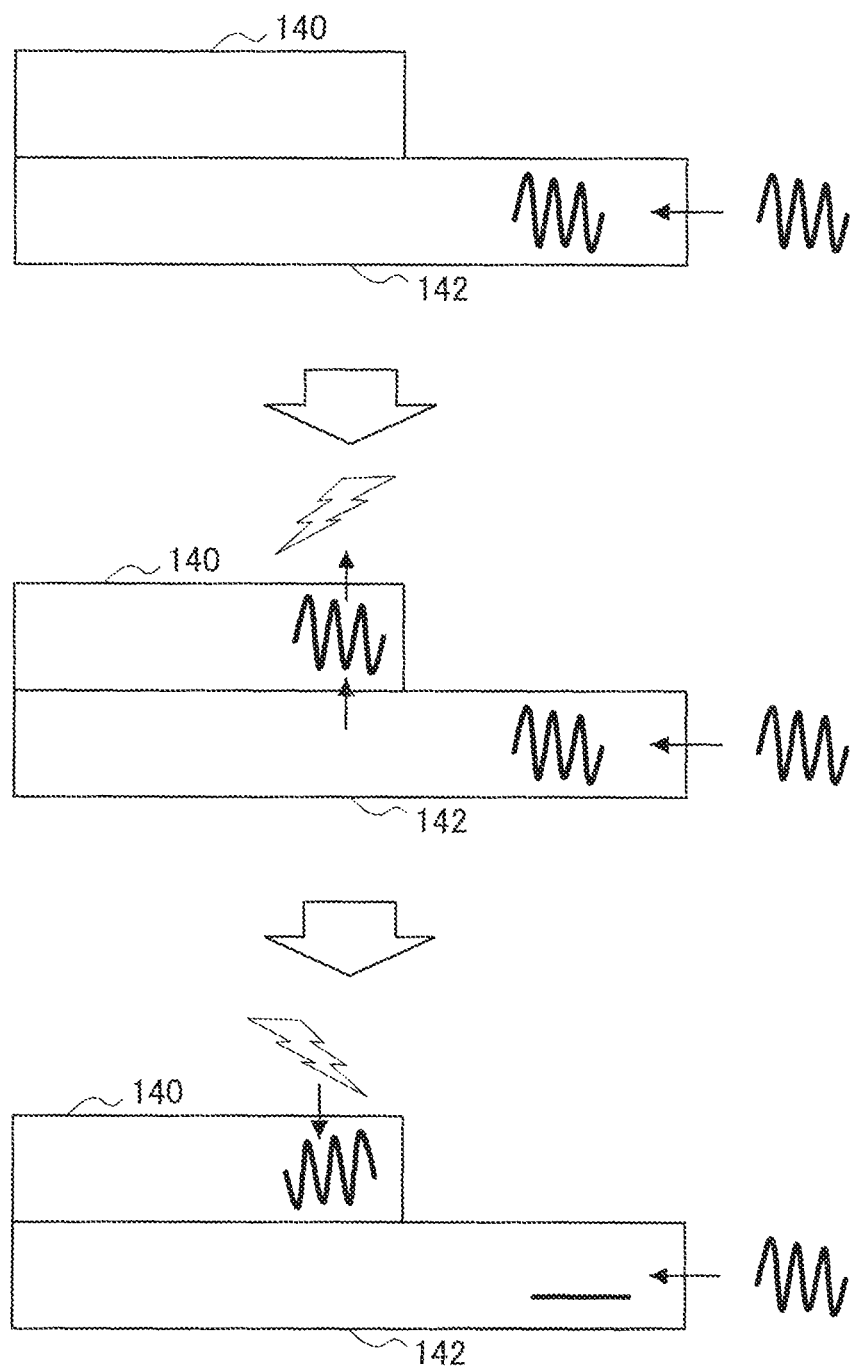
FIG. 11 is an explanatory diagram illustrating an example in which noise vibration is suppressed in a case in which vibration is not output in the tactile vibration control device according to the embodiment.
Figure 12:
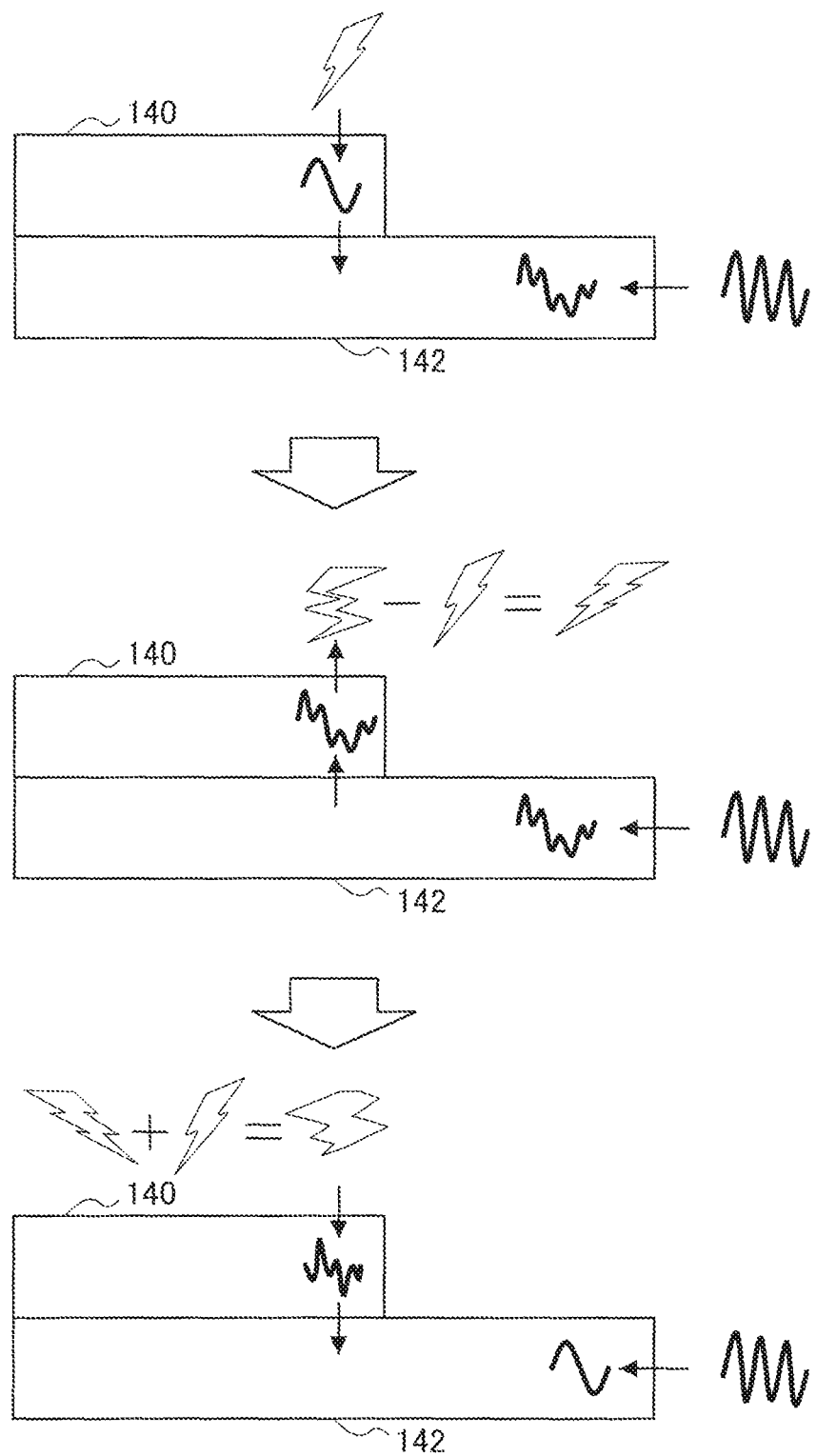
FIG. 12 is an explanatory diagram illustrating an example in which noise vibration is suppressed in a case in which vibration is output in the tactile vibration control device according to the embodiment.

In addition, the signal processing unit 130 generates detection vibration information on the basis of vibration received by the vibration output unit 132. Specifically, the signal processing unit 130 generates the detection vibration information on the basis of an electromotive force generated in the vibration output unit 132 due to tactile the vibration received by the vibration output unit 132. In addition, the signal processing unit 130 may generate the noise vibration information on the basis of the electromotive force. Further, an example in which noise vibration is suppressed in response to processes of the vibration control unit 122 and the signal processing unit 130 will be described with reference to FIGS. 11 and 12. FIG. 11 is an explanatory diagram illustrating an example in which noise vibration is suppressed in a case in which vibration is not output in the tactile vibration control device 100-2 according to the embodiment. FIG. 12 is an explanatory diagram illustrating an example in which noise vibration is suppressed in a case in which vibration is output in the tactile vibration control device 100-2 according to the embodiment.

First, an example in which the noise vibration is suppressed in a case in which vibration is not output in the tactile vibration control device 100-2 will be described with reference to FIG. 11.

The signal processing unit 130 generates the detection vibration information on the basis of a signal input from the vibration output unit 132. For example, as illustrated in the upper drawing and the middle drawing of FIG. 11, when external vibration is transferred to a vibration actuator 140 via a vibration transfer member 142, an electromotive force is generated in the vibration actuator 140. Therefore, as illustrated in the middle drawing of FIG. 11, a signal based on the electromotive force is generated in the vibration actuator 140 and the generated signal is input to the signal processing unit 130. The signal processing unit 130 generates detection vibration information in accordance with a signal input from the vibration output unit 132. Then, the signal processing unit 130 inputs the generated detection vibration information to the vibration control unit 122.

Subsequently, the vibration control unit 122 generates noise suppression vibration information on the basis of the input detection vibration information. Note that since the process is substantially the same as the process according to the first embodiment, the description thereof will be omitted.

Subsequently, the vibration control unit 122 inputs the generated noise suppression vibration information as output vibration information to the vibration output unit 132 via the signal processing unit 130. For example, the vibration control unit 122 inputs the generated noise suppression vibration information as output vibration information to the signal processing unit 130. The signal processing unit 130 generates a signal on the basis of the input output vibration information and inputs a signal generated as illustrated in the lower drawing of FIG. 11 to the vibration actuator 140. Then, when vibration with a waveform in accordance with the input signal output by the vibration actuator 140 is to the vibration transfer member 212, as illustrated in the lower drawing of FIG. 11, the noise vibration (detection vibration) in the vibration transfer member 212 is suppressed.

Next, an example in which noise vibration is suppressed in a case in which vibration in the tactile vibration control device 100-2 is output will be described with reference to FIG. 12. Note that the description of content which is substantially the same as the above-described content will be omitted.

The signal processing unit 130 generates noise vibration information on the basis of a signal input from the vibration output unit 132. For example, as illustrated in the upper drawing and the middle drawing of FIG. 12, when vibration is generated outside of the tactile vibration control device 100-2 while the vibration is output by the vibration actuator 140, composite vibration of the output vibration and the generated vibration is transferred to the vibration actuator 140 via the vibration transfer member 212. Then, an electromotive force in accordance with the transferred vibration is generated in the vibration actuator 140. Therefore, as illustrated in the middle drawing of FIG. 12, a signal based on the electromotive force in the vibration actuator 140 is generated and the generated signal is input to the signal processing unit 130. The signal processing unit 130 detects noise vibration on the basis of a signal input from the vibration output unit 132 and a signal in accordance with target vibration, as illustrated in the middle drawing of FIG. 12. Then, the signal processing unit 130 inputs noise vibration information regarding the detected noise vibration to the vibration control unit 122.

Subsequently, the vibration control unit 122 generates noise suppression vibration information on the basis of the input noise vibration information and target vibration information. Note that since this process is substantially the same as some of the processes according to the first embodiment, the description thereof will be omitted.

Subsequently, the vibration control unit 122 inputs the output vibration information generated on the basis of the generated noise suppression vibration information and the target vibration information to the vibration output unit 132 via the signal processing unit 130. For example, the vibration control unit 122 generates vibration information regarding composite vibration of the noise suppression vibration and the target vibration and inputs the generated vibration information as output vibration information to the signal processing unit 130. The signal processing unit 130 generates a signal on the basis of the input output vibration information and inputs the generated signal to the vibration actuator 140, as illustrated in the lower drawing of FIG. 12. Then, when vibration with a waveform in accordance with input signal is output by the vibration actuator 140 to the vibration transfer member 212, only noise vibration (vibration generated outside) in the vibration transfer member 212 is suppressed. As a result, as illustrated in the lower drawing of FIG. 12, only the target vibration is perceived with the vibration transfer member 212.

(Vibration Output Unit)

The vibration output unit 132 outputs vibration in accordance with the input signal. Note that since a vibration output process of the vibration output unit 132 is substantially the same as the process of the vibration output unit 226 according to the first embodiment, the description thereof will be omitted.

In addition, the vibration output unit 132 outputs a signal in accordance with the transferred vibration. Specifically, when the vibration is transferred to the vibration actuator 140 which is a constituent element of the vibration output unit 132 via the vibration transfer member 212, an electromotive force is generated inside the vibration actuator 140. The vibration actuator 140 outputs a current generated due to the generated electromotive force. Then, the output current is input as a signal to the signal processing unit 130.

<2-2. Conclusion of Second Embodiment>

In this way, according to the second embodiment of the present disclosure, the detection vibration is detected on the basis of an electromotive force generated in the vibration output unit 132 in accordance with the vibration received by the vibration output unit 132. Therefore, a device such as the vibration sensor 210 executing the vibration detection described in the first embodiment can be omitted. Accordingly, by simplifying the configuration of the tactile vibration control device 100-2, it is possible to reduce manufacturing cost and weight of the tactile vibration control device 100-2.

<2-3. Modification Examples>

The second embodiment of the present disclosure has been described above. Note that the embodiment is not limited to the above-described example. Hereinafter first and second modification examples of the embodiment will be described.

(First Modification Example)

Figure 13:
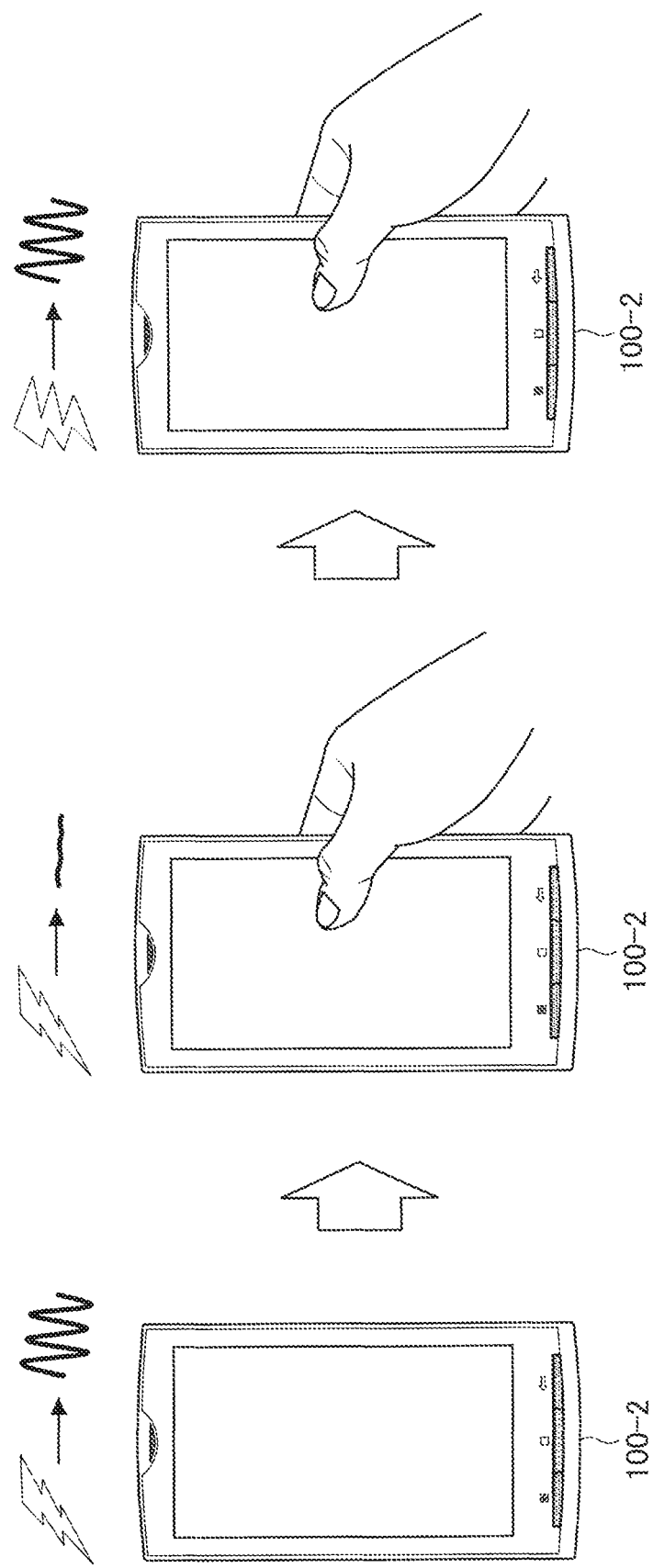
FIG. 13 is an explanatory diagram illustrating an example of feedback control on target vibration in a tactile vibration control device according to a first modification example of the embodiment.

According to the first modification example of the embodiment, the tactile vibration control device 100-2 may perform feedback control on the target vibration. Specifically, the vibration control unit 122 controls amplitude of the target vibration on the basis of comparison between the amplitude of the target vibration in the detection vibration and the target amplitude. Further, an example of a process of controlling the amplitude of the target vibration will be described with reference to FIG. 13. FIG. 13 is an explanatory diagram illustrating an example of the feedback control on the target vibration in the tactile vibration control device 100-2 according to the first modification example of the embodiment. Note that it is assumed that vibration is not transferred from the outside of the tactile vibration control device 100-2 herein.

First, the vibration control unit 122 causes the vibration output unit 132 to output the target vibration. For example, the vibration control unit 122 generates target vibration information in response to a vibration generation request and inputs the generated target vibration information as output vibration information to the signal processing unit 130. The signal processing unit 130 generates a signal on the basis of the input target vibration information and inputs the generated signal to the vibration output unit 132. The vibration output unit 132 outputs vibration with a waveform in accordance with the input signal, as illustrated in the left drawing of FIG. 13. Then, the output vibration is transferred to the outside of the tactile vibration control device 100-2 via the vibration transfer member 212.

Subsequently, the vibration control unit 122 determines whether the vibration transferred to the vibration output unit 132 agrees with the target vibration. For example, when the vibration is transferred from the vibration transfer member 212, the vibration output unit 132 outputs a signal based on the electromotive force generated due to the transferred vibration. The output signal is converted into detection vibration information by the signal processing unit 130, and the detection vibration information is input to the vibration control unit 122. Then, the vibration control unit 122 determines whether the amplitude of the detection vibration agrees with the amplitude of the target vibration on the basis of the input detection vibration information and the target vibration information. Note that a divergence of the agreement may be permitted within a predetermined range.

In a case in which the vibration control unit 122 determines that the detection vibration does not agree with the target vibration, the vibration control unit 122 controls the target vibration on the basis of a difference between the detection vibration and the target vibration. For example, as illustrated in the middle drawing of FIG. 13, since the user grasps the tactile vibration control device 100-2, the amplitude of the vibration transferred to the vibration transfer member 212 is suppressed in some cases. In these cases, since the vibration control unit 122 determines that the amplitude of the detection vibration does not agree with the amplitude of the target vibration, the vibration control unit 122 calculates a difference in the amplitude. Subsequently, the vibration control unit 122 generates target vibration information in which the amplitude of the target vibration is changed so that the calculated difference in the amplitude disappears. Subsequently, the vibration control unit 122 inputs the generated target vibration information as output vibration information to the signal processing unit 130. The changed target vibration information input to the signal processing unit 130 is converted into a signal, and the signal is input to the vibration output unit 132. Then, the vibration output unit 132 outputs the changed target vibration on the basis of the input signal. As a result, as illustrated in the right drawing of FIG. 13, the user can be caused to perceive the target vibration.

Figure 14:
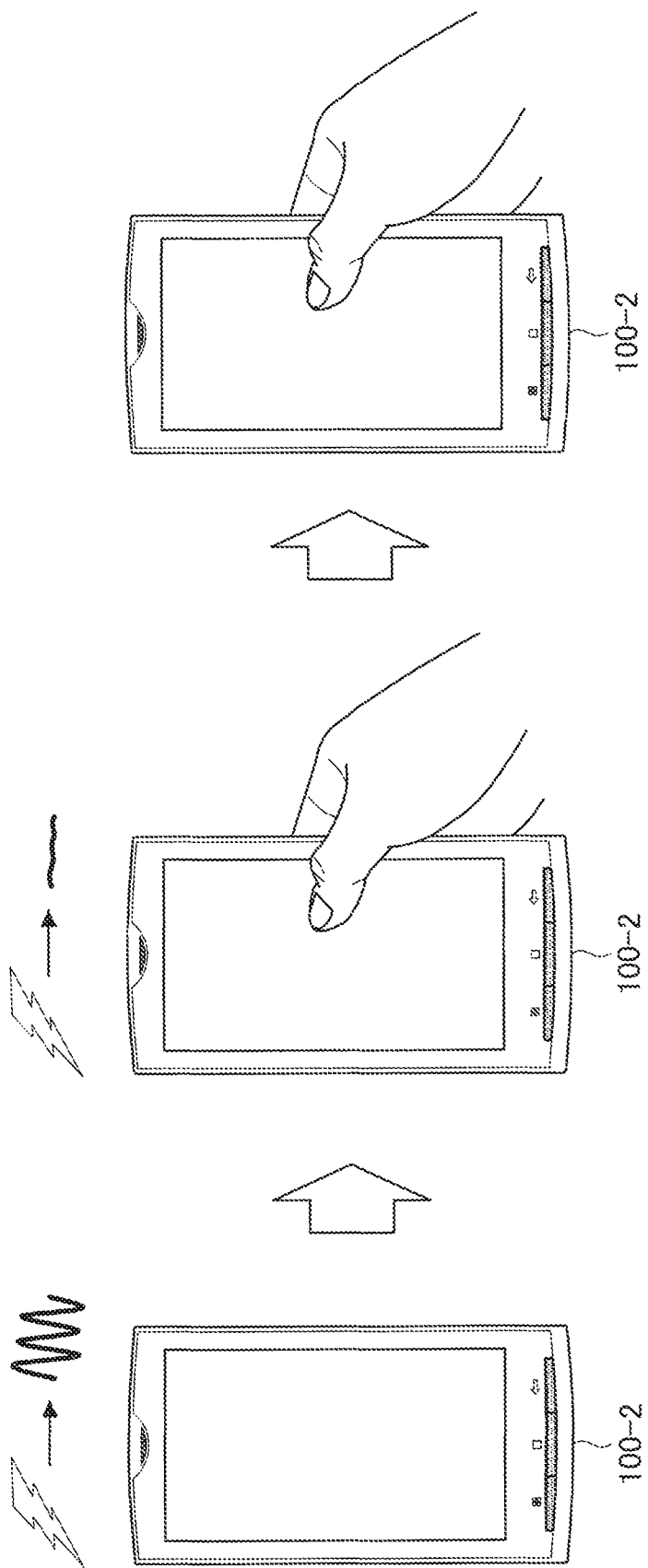
FIG. 14 is an explanatory diagram illustrating another example of feedback control on target vibration in the tactile vibration control device according to the first modification example of the embodiment.

In addition, the vibration control unit 122 may control whether the target vibration is output on the basis of comparison between the amplitude of the target vibration in the detection vibration and the target amplitude. Further, another example of the control process on the amplitude of the target vibration will be described with reference to FIG. 14. FIG. 14 is an explanatory diagram illustrating another example of the feedback control on the target vibration in the tactile vibration control device 100-2 according to the first modification example of the embodiment. Note that the description of the processes which are substantially the same as the above-described processes will be omitted.

The vibration control unit 122 first causes the vibration output unit 132 to output the target vibration and then determines whether the vibration transferred to the vibration output unit 132 agrees with the target vibration.

In a case in which the vibration control unit 122 determines that the detection vibration does not agree with the target vibration, the vibration control unit 122 controls the target vibration on the based on a difference between the detection vibration and the target vibration. For example, in a case in which vibration control unit 122 determines that the amplitude of the detection vibration does not agree with the amplitude of the target vibration, the vibration control unit 122 determines whether the difference in the amplitude is equal to or greater than a threshold. When the vibration control unit 122 determines that the difference in the amplitude is equal to or greater than the threshold, the vibration control unit 122 causes output of the vibration to be stopped. That is, the vibration control unit 122 causes the signal processing unit 130 to stop input of the signal to the vibration output unit 132. As a result, as illustrated in the right drawing of FIG. 14, output of the vibration is stopped.

Note that in the foregoing two examples, vibration is assumed not to be transferred from the outside of the tactile vibration control device 100-2 to facilitate the description. However, in a case in which vibration is transferred from the outside, the composite vibration of the noise suppression vibration and the target vibration may be output in the former example and only the noise suppression vibration may be output in the latter example. In addition, in the latter example, the output of the noise suppression vibration may be stopped.

In this way, according to the first modification example of the embodiment, the tactile vibration control device 100-2 controls the amplitude of the target vibration on the basis of comparison between the amplitude of the target vibration in the detection vibration and the target amplitude. Here, even in a case in which the noise vibration is suppressed and the target vibration is perceived, as described above, the amplitude of the target vibration is attenuated in some cases. In this configuration, however, by changing the amplitude of the target vibration using feedback control, the user can be caused to perceive the target vibration with desired amplitude.

In addition, the tactile vibration control device 100-2 controls whether the target vibration is output on the basis of comparison between the amplitude of the target vibration in the detection vibration and the target amplitude. Here, as an attenuation of the target vibration is larger, a processing load and power consumption associated with an increase in the amplitude of the above-described target vibration increase. Accordingly, in this configuration, output of the target vibration is stopped, for example, in a case in which the target vibration is attenuated the extent that the user rarely perceive the attenuation of the target vibration or the like. Thus, it is possible to reduce the processing load and the power consumption.

(Second Modification Example)

Figure 15:
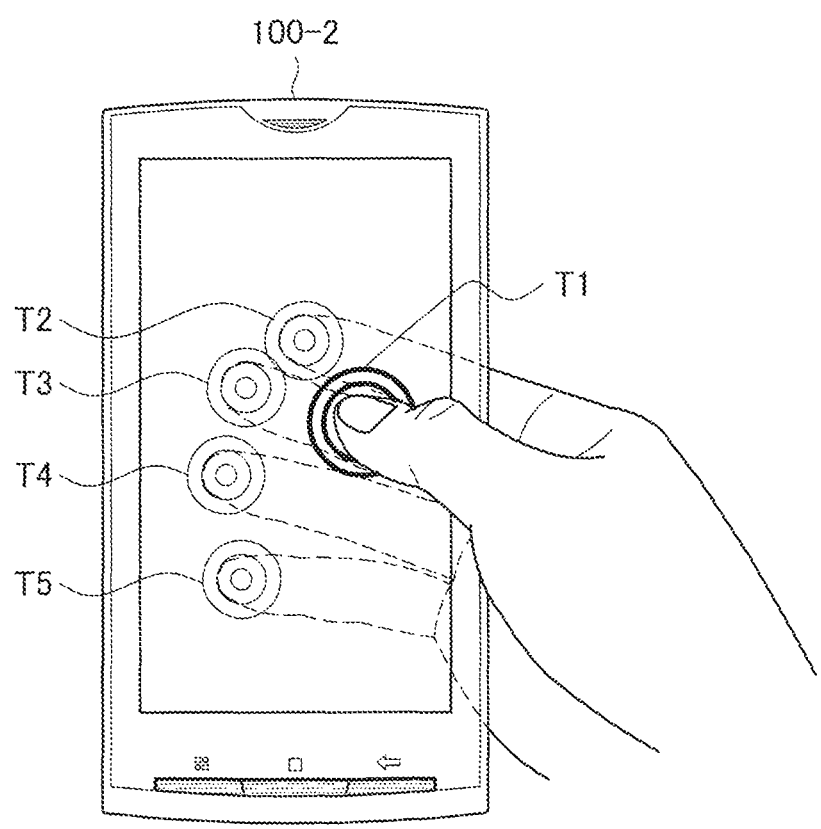
FIG. 15 is an explanatory diagram illustrating an example in which vibration control is executed at a gripping position of a tactile vibration control device according to a second modification example of the embodiment.

According to the second modification example of the embodiment, the tactile vibration control device 100-2 may control the tactile vibration which the user is caused to perceive at a specific position in the vibration transfer member 142. Specifically, the vibration control unit 122 controls the noise suppression vibration suppressing the noise vibration other than the target vibration at the specific position in the vibration transfer member 142 to which the tactile vibration is transferred. Further, a process of controlling the noise suppression vibration in the vibration control unit 122 according to the modification example will be described with reference to FIG. 15. FIG. 15 is an explanatory diagram illustrating an example in which vibration control is executed at a gripping position of the tactile vibration control device 100-2 according to the second modification example of the embodiment.

First, the vibration control unit 122 specifies a position on the vibration transfer member 142 which is a control target. Specifically, the vibration control unit 122 specifies a position at which the user comes into contact with the vibration transfer member 142 (hereinafter also referred to as a contact position). For example, the vibration control unit 122 determines a position at which vibration output from each of a plurality of vibration actuators is weakened, as a contact position using the plurality of vibration actuators. As illustrated in FIG. 15, in a case in which the user grips the tactile vibration control device 100-2, contact points T1 to T5 between a finger of the user and the exterior of the vibration transfer member 142 are determined as contact positions. Note that information for specifying the contact position may be generated on the basis of image information obtained through imaging or may be touch position information obtained in a touch sensor or the like. In addition, the information for specifying the contact position may be generated by an external device and may be acquired through communication.

Subsequently, the vibration control unit 122 causes the vibration output unit 132 to output noise suppression vibration suppressing the noise vibration at the specified contact position. For example, when the contact position is specified, the vibration control unit 122 ascertains noise vibration at the contact position and decides the noise suppression vibration suppressing the ascertained noise vibration. Subsequently, the vibration control unit 122 generates output vibration information on the basis of the decided noise suppression vibration and the target vibration and inputs the generated output vibration information to the signal processing unit 130. Then, the output vibration information is converted into a signal by the signal processing unit 130 and the vibration output unit 132 outputs the vibration on the basis of the converted signal.

Note that the example in which the noise suppression vibration is controlled has been described above. However, the target vibration may be controlled instead or in addition to the noise suppression vibration.

In this way, according to the second modification example of the embodiment, the noise suppression vibration includes vibration suppressing the noise vibration other than the target vibration at the specific position in the vibration transfer member 142 to which vibration is transferred. Here, there is a restriction on the number of vibration actuators 140 which can be installed in the device, and thus it is difficult to give vibration to the entire vibration transfer member 142 in some cases. Thus, according to this configuration, since the noise suppression vibration can be added at only the specific position, the noise vibration can be effectively suppressed with the less vibration actuators 140.

In addition, the specific position includes positions coming into contact with the user. Therefore, by adding the noise suppression vibration locally at a position at which the user perceives tactile vibration, it can be more difficult to perceive the noise vibration.

<3. Third Embodiment (Example in Which Plurality of Vibration Actuators are Used)>

The second embodiment of the present disclosure has been described above. Next, a third embodiment of the present disclosure will be described. In the third embodiment, the tactile vibration control device 100-3 and a tactile vibration device 200-3 are separately included. In addition, the tactile vibration device 200-3 includes the plurality of vibration actuators 208. Note that since a physical configuration of each device is substantially the same as the physical configuration of the device according to the first or second embodiment, the description thereof will be omitted.

<3-1. Logical Configurations of Devices>

Logical configurations of the tactile vibration control device 100-3 and the tactile vibration device 200-3 according to the third embodiment of the present disclosure will be described. Note that the logical configuration which is substantially the same as the logical configuration of the first or second embodiment will be omitted.

(Logical Configuration of Tactile Vibration Control Device)

First, the logical configuration of the tactile vibration control device 100-3 according to the embodiment will be described. Note that constituent elements are substantially the same as those of the first embodiment.

(Vibration Control Unit)

Figure 16:
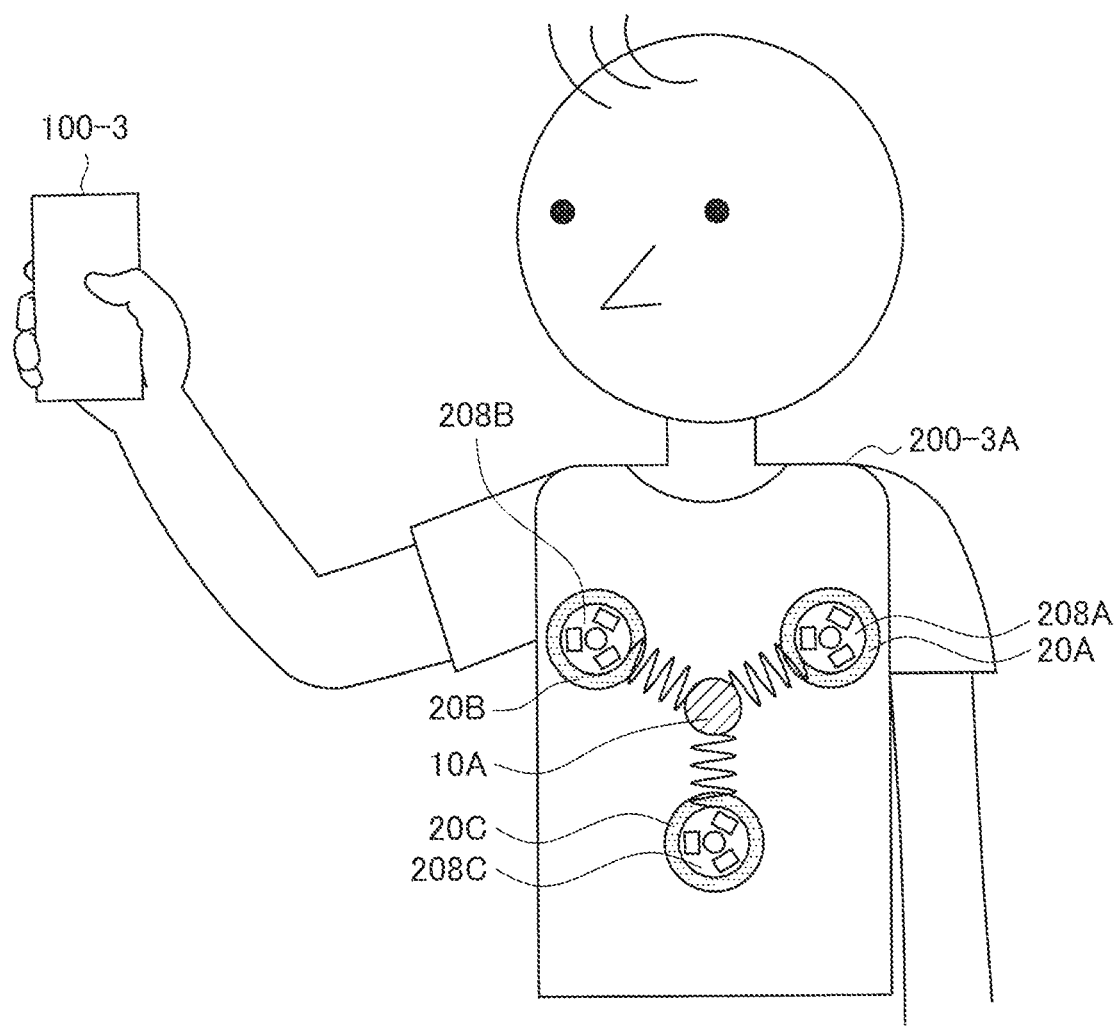
FIG. 16 is an explanatory diagram illustrating an example of vibration output using a plurality of vibration actuators according to a third embodiment of the present disclosure.

The vibration control unit 122 controls output of the plurality of vibration output units 226 included in the tactile vibration device 200-3. Specifically, the vibration control unit 122 controls the vibration output units 226 such that composite vibration of tactile vibration which is fourth vibration output by each of the plurality of vibration output units 226 (hereinafter also referred to as individual vibration) becomes target vibration. Further, a process of controlling the target vibration of the vibration control unit 122 according to the embodiment will be described with reference to FIG. 16. FIG. 16 is an explanatory diagram illustrating an example of vibration output using the plurality of vibration actuators 208 according to the embodiment.

First, the vibration control unit 122 generates vibration information regarding individual vibration caused to be output to the vibration output unit 226 (hereinafter also referred to as individual vibration information) on the basis of the target vibration. For example, the vibration control unit 122 decides the target vibration on the basis of a vibration generation request or the like. Subsequently, the vibration control unit 122 decides individual vibration realizing the decided target vibration. The individual vibration is decided so that the composite vibration of the plurality of kinds of individual vibration becomes the target vibration. Note that a positional relation between the plurality of vibration actuators 208 outputting the individual vibration is assumed to be known. Then, the vibration control unit 122 generates the individual vibration information regarding the decided individual vibration.

Subsequently, the vibration control unit 122 supplies the generated individual vibration information as output vibration information to the tactile vibration device 200-3 through communication. For example, the vibration control unit 122 causes the communication unit 126 to transmit the generated individual vibration information to the tactile vibration device 200-3. Then, in the tactile vibration device 200-3, each of the plurality of vibration actuators 208A to 208C outputs the individual vibration based on the individual vibration information. Thus, the user can be caused to perceive target vibration in a region 10A in which the plurality of pieces of output individual vibrations overlap each other, as illustrated in FIG. 16.

In addition, the vibration control unit 122 causes the plurality of vibration output units 226 to output noise suppression vibration suppressing noise vibration other than the individual vibration output by the plurality of vibration output units 226. Further, a process of controlling the noise suppression vibration in the vibration control unit 122 according to the embodiment will be described with reference to FIG. 16.

First, the vibration control unit 122 acquires detection vibration information. For example, the detection vibration information regarding the vibration detected in a tactile vibration device 200-3A is transmitted from the tactile vibration device 200-3A. Note that the detection vibration information may be generated on the basis of a signal obtained from each of the vibration actuators 208A to 208C and may be generated on the basis of signals obtained from some of the vibration actuators 208A to 208C. Then, the vibration control unit 122 acquires the detection vibration information received by the communication unit 126.

Subsequently, the vibration control unit 122 generates noise suppression vibration information on the basis of the acquired detection vibration information. For example, the vibration control unit 122 generates the noise suppression vibration information on the basis of the individual vibration information with regard to each of the plurality of pieces of acquired detection vibration information. Note that the process of generating the noise suppression vibration information is substantially the same as the process in the first embodiment.

Subsequently, the vibration control unit 122 generates output vibration information from the generated noise suppression vibration information and the individual vibration information and supplies the generated output vibration information to the tactile vibration device 200-3A through communication. For example, the vibration control unit 122 generates vibration information regarding composite vibration of the noise suppression vibration and the individual vibration as individual output vibration information. Then, the vibration control unit 122 causes the communication unit 126 to transmit the generated output vibration information along with information for specifying the vibration actuators 208 corresponding to the output vibration information. Then, in the tactile vibration device 200-3A, each of the plurality of vibration actuators 208A to 208C outputs vibrations based on each piece of output vibration information. Thus, the noise vibration in regions 20A to 20C around the vibration actuators 208A to 208C illustrated in FIG. 16 is suppressed, and thus it is possible to improve sensitivity of the target vibration perceived in the region 10A.

Note that the noise suppression vibration may be the same among the plurality of vibration output units 226. For example, the noise suppression vibration generated on the basis of the vibration received by some of the plurality of vibration output units 226 may be output by each of the plurality of vibration output units 226.

(Logical Configuration of Tactile Vibration Device)

Next, a logical configuration of the tactile vibration device 200-3 according to the embodiment will be described. Note that constituent elements are substantially the same as those of the first embodiment.

(Signal Processing Unit)

The signal processing unit 224 generates an input signal to be input to the plurality of vibration output units 226 on the basis of the output vibration information supplied from the tactile vibration control device 100-3. Specifically, in a case in which the number of pieces of output vibration information received by the communication unit 222 is plural, the signal processing unit 224 generates a signal on the basis of each of the plurality of pieces of output vibration information. Then, the signal processing unit 224 inputs each of the generated signals to each of the corresponding vibration output units 226. Note that in a case in which the number of pieces of output vibration information is 1, the signal processing unit 224 generates only one input signal and input the generated signal to each of the plurality of vibration output units 226.

<3-2. Conclusion of Third Embodiment>

In this way, according to the third embodiment of the present disclosure, the target vibration includes the composite vibration of the individual vibration output by the plurality of vibration output units 226, and the noise suppression vibration includes the tactile vibration suppressing the tactile vibration other than the individual vibration. Therefore, the user can be caused to perceive the stronger target vibration and more various kinds of target vibration than in a case in which the number of vibration actuators 208 is single. Further, by suppressing the noise vibration other than the individual vibration in which the noise suppression vibration realizes the target vibration, it is possible to emphasize the target vibration.

<3-3. Modification Examples>

The third embodiment of the present disclosure has been described above. Note that the embodiment is not limited to the above-described example. Hereinafter, a modification example of the embodiment will be described.

Figure 17:
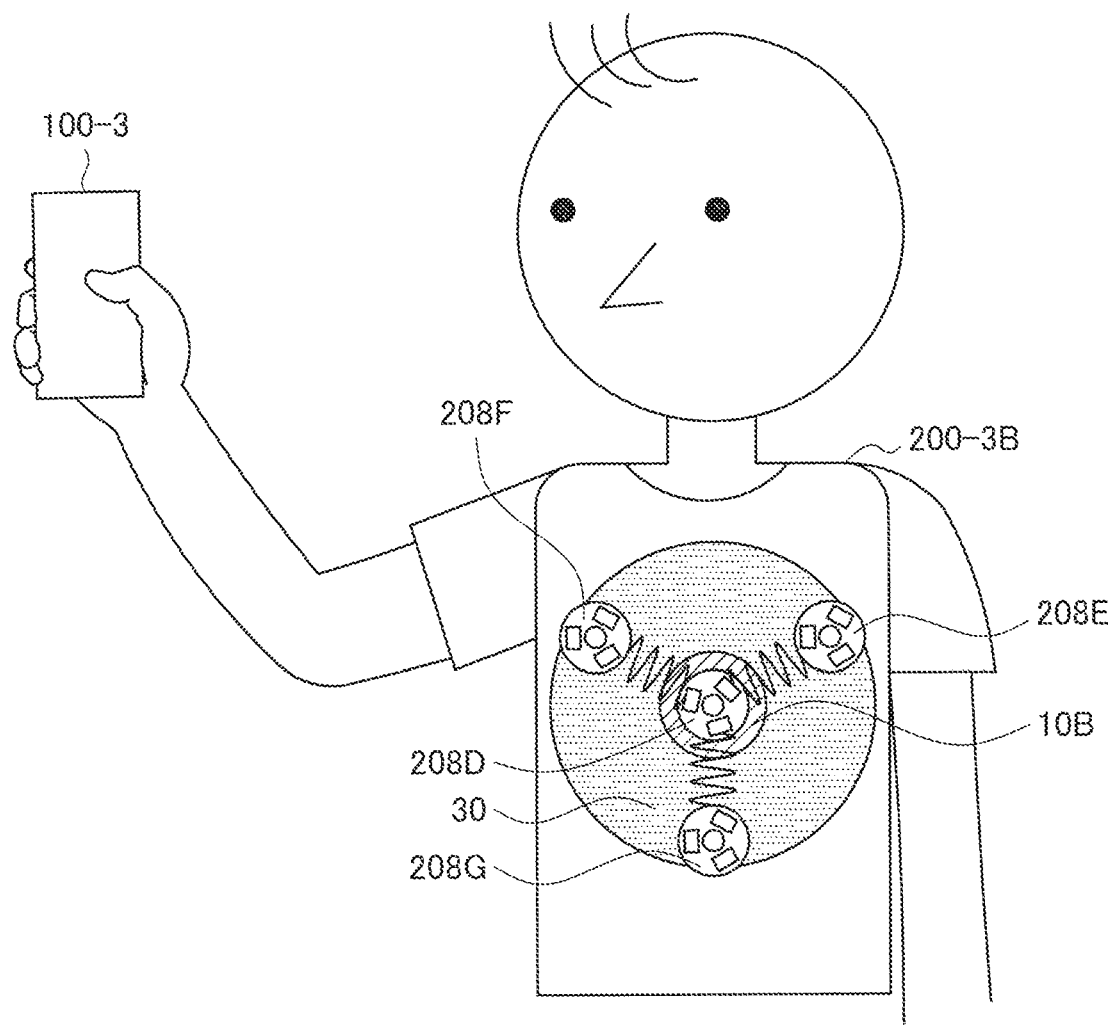
FIG. 17 is an explanatory diagram illustrating another example of vibration output using the plurality of vibration actuators according to the embodiment.

According to the modification example of the embodiment, the tactile vibration control device 100-3 may suppress expansion of the vibration output by the specific vibration output unit 226. Specifically, the vibration control unit 122 causes another vibration output unit 226 different form the specific vibration output unit 226 to output, as third tactile vibration, tactile vibration suppressing the individual vibration which is fifth tactile vibration output by the specific vibration output unit 226 among the plurality of vibration output units 226. Further, a process of controlling the noise suppression vibration of the vibration control unit 122 according to the modification example will be described with reference to FIG. 17. FIG. 17 is an explanatory diagram illustrating another example of vibration output using the plurality of vibration actuators 208 according to the embodiment. Note that the description of the processes which are substantially the same as the above-described processes will be omitted.

First, the vibration control unit 122 generates individual vibration information caused to be output by the specific vibration output unit 226 on the basis of the target vibration. For example, the vibration control unit 122 decides the individual vibration as the target vibration and generates the individual vibration information regarding the decided individual vibration.

Subsequently, the vibration control unit 122 supplies the generated individual vibration information as output vibration information to the tactile vibration device 200-3B through communication. For example, the vibration control unit 122 causes the communication unit 126 to transmit the generated individual vibration information to the tactile vibration device 200-3B.

In the tactile vibration device 200-3B receiving the individual vibration information, the individual vibration regarding the individual vibration information is output from the specific vibration output unit 226. For example, a vibration actuator 208D specified among a plurality of vibration actuators 208D to 208G outputs the individual vibration based on the individual vibration information. Note that the other vibration actuators 208E to 208G do not output the individual vibration based on the individual vibration information. Thus, the user can be caused to perceive the output individual vibration in the region 10B, as illustrated in FIG. 17.

In addition, in the tactile vibration device 200-3B, vibration suppressing the individual vibration in the other vibration output units 226 other than the specific vibration output unit 226 is output. For example, the signal processing unit 224 generates a signal in accordance with vibration suppressing the individual vibration related to the individual vibration information, that is, vibration with a reverse phase to the individual vibration. Subsequently, the signal processing unit 224 inputs the generated signal to each of the other vibration actuators 208E to 208G. Note that the vibration information regarding the vibration suppressing the individual vibration may be generated in the tactile vibration control device 100-3. Then, each of the other vibration actuators 208E to 208G outputs vibration in accordance with the input signal. Thus, the individual vibration transferred from the vibration actuator 208D is suppressed in the periphery of the other vibration actuators 208E to 208G and is perceived only in, for example, a region 30 illustrated in FIG. 17.

Note that the vibration suppressing the individual vibration output in the other vibration output units 226 may be vibration weaker than the individual vibration output by the specific vibration output unit 226. Specifically, the vibration control unit 122 causes the other vibration output units 226 to output the individual vibration with amplitude less than the amplitude of the individual vibration output by the specific vibration output unit 226. In this case, it is possible to prevent the individual vibration output by the specific vibration output unit 226 from being weak to excess.

In this way, according to the modification example of the embodiment, the noise suppression vibration includes the tactile vibration suppressing the individual vibration output by the specific vibration output unit 226 among the plurality of vibration output units 226. Therefore, since the expansion of the individual vibration is suppressed, it is possible to improve localization of the vibration caused to be perceived by the user. Accordingly, it is possible to improve sensitivity of the user to the individual vibration as the target vibration.

<4. Conclusion>

As described above, according to the first embodiment of the present disclosure, by causing the second tactile stimulus generation source to output tactile stimulus in which the user is caused to perceive only a desired tactile stimulus, the user can be caused to perceive the desired tactile stimulus more reliably.

In addition, according to the second embodiment of the present disclosure, it is possible to omit a device such as the vibration sensor 210 detecting vibration, as described in the first embodiment. Accordingly, by simplifying the configuration of the tactile vibration control device 100-2, it is possible to reduce manufacturing cost and weight of the tactile vibration control device 100-2.

In addition, according to the third embodiment of the present disclosure, the user can be caused to perceive stronger target vibration or various kinds of target vibration than in a case in which the number of vibration actuator 208 is single. Further, the noise suppression vibration suppresses noise vibration other than individual vibration for realizing the target vibration, so that the target vibration can be emphasized.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiments, the tactile vibration has been presented to the user, but the present technology is not limited to the examples. For example, as the tactile stimulus other than the tactile vibration, for example, a force stimulus such as heat, a pressure, or a suction force, a nociceptive stimulus, an electrical stimulus, or the like may be presented to the user. In addition, a plurality of tactile stimuli may be presented to the user.

In addition, in the foregoing third embodiment, the example in which the plurality of vibration actuators 208 are included in the tactile vibration device 200 has been described. Instead, the plurality of tactile vibration devices 200 may be included.

In addition, the configuration according to each of the foregoing embodiments or the modification examples can be combined. For example, the tactile vibration control device 100 according to the second or third embodiment may include the vibration sensor 210 like the first embodiment.

Further, the effects described in this specification are merely illustrative or exemplified effects, and are not limitative. That is, with or in the place of the above effects, the technology according to the present disclosure may achieve other effects that are clear to those skilled in the art from the description of this specification.

In addition, the steps of the flowchart according to the foregoing embodiment include not only processes chronologically executed in the described order but also processes executed separately or in parallel although the processes are not necessarily chronologically. In addition, it is needless to say that the order of the chronologically processed steps can be changed appropriately in some cases.

In addition, a computer program exerting the same function as that of each logical configuration of the above-described tactile vibration control device 100 in a computer system can also be generated. In addition, a storage medium that stores the computer program is also supplied. Here, the computer system includes a single computer such as hardware contained in the tactile vibration control device 100 or a plurality of computers executing a series of processes.

Additionally, the present technology may also be configured as below.

(1)

A control device including:

an information acquisition unit configured to obtain first information regarding a tactile stimulus transferred from a first tactile stimulus generation source and second information regarding a tactile stimulus which a user is caused to perceive; and a control unit configured to control output of a tactile stimulus of a second tactile stimulus generation source different from the first tactile stimulus generation source on a basis of the first information and the second information.

(2)

The control device according to (1), in which the tactile stimulus includes tactile vibration, and the control unit controls output of third tactile vibration suppressing tactile vibration other than second tactile vibration related to the second information in first tactile vibration related to the first information with regard to the second tactile stimulus generation source.

(3)

The control device according to (2), in which the second tactile vibration includes composite vibration of fourth tactile vibration output by a plurality of the second tactile stimulus generation sources, and the third tactile vibration includes tactile vibration suppressing tactile vibration other than the fourth tactile vibration.

(4)

The control device according to (2) or (3), in which the third tactile vibration includes tactile vibration suppressing fifth tactile vibration output by the specific second tactile generation source among a plurality of the second tactile stimulus generation sources.

(5)

The control device according to (4), in which amplitude of the tactile vibration suppressing the fifth tactile vibration includes amplitude less than amplitude of the fifth tactile vibration.

(6)

The control device according to any one of (2) to (5), in which the first tactile vibration includes detected tactile vibration.

(7)

The control device according to (6), in which the first tactile vibration is detected by a tactile vibration measurement device.

(8)

The control device according to (6) or (7), in which the second tactile stimulus generation source includes a tactile vibration generation device, and the first tactile vibration is detected on a basis of an electromotive force generated in the tactile vibration generation device due to tactile vibration received by the tactile vibration generation device.

(9)

The control device according to any one of (2) to (8), in which the first tactile vibration includes tactile vibration that is estimated to be generated.

(10)

The control device according to any one of (2) to (9), in which the third tactile vibration includes tactile vibration suppressing tactile vibration other than the second tactile vibration at a specific position in a transfer unit to which tactile vibration is transferred.

(11)

The control device according to (10), in which the specific position includes a position coming into contact with the user.

(12)

The control device according to any one of (2) to (11), in which the control unit causes the second tactile vibration to the second tactile stimulus generation source to output the second tactile vibration.

(13)

The control device according to (12), in which the control unit controls amplitude of the second tactile vibration on a basis of comparison between amplitude of the second tactile vibration in the first tactile vibration and target amplitude.

(14)

The control device according to (12) or (13), in which the control unit controls whether the second tactile vibration is output on a basis of comparison between amplitude of the second tactile vibration in the first tactile vibration and target amplitude.

(15)

The control device according to any one of (2) to (14), in which the third tactile vibration includes tactile vibration suppressing tactile vibration with a specific frequency or amplitude in tactile vibration other than the second tactile vibration.

(16)

The control device according to (15), in which the specific frequency or amplitude is decided on a basis of frequency or amplitude of the second tactile vibration.

(17)

The control device according to any one of (2) to (16), in which the control unit controls a form of the third tactile vibration on a basis of information regarding an environment around the user, information regarding a behavior of the user, or information regarding a nature or a form of a transfer unit to which tactile vibration is transferred.

(18)

A control method including, by a processor:

obtaining first information regarding a tactile stimulus transferred from a first tactile stimulus generation source and second information regarding a tactile stimulus which a user is caused to perceive; and controlling output of a tactile stimulus of a second tactile stimulus generation source different from the first tactile stimulus generation source on a basis of the first information and the second information.

(19)
A program causing a computer system to realize:
an information acquisition function of obtaining first information regarding a tactile stimulus transferred from a first tactile stimulus generation source and second information regarding a tactile stimulus which a user is caused to perceive; and
a control function of controlling output of a tactile stimulus of a second tactile stimulus generation source different from the first tactile stimulus generation source on a basis of the first information and the second information.

REFERENCE SIGNS LIST 100 tactile vibration control device
122 vibration control unit
124 storage unit
126 communication unit
130 signal processing unit
132 vibration output unit
140 vibration actuator
142 vibration transfer member
200 tactile vibration device
208 vibration actuator
210 vibration sensor
212 vibration transfer member
222 communication unit
224 signal processing unit
226 vibration output unit
228 vibration detection unit

The invention claimed is:

1. A control device, comprising:
an information acquisition unit configured to:
obtain first information regarding a detected tactile vibration, wherein the detected tactile vibration corresponds to a first tactile stimulus transferred from a first tactile stimulus generation source; and
obtain second information regarding a target vibration to be perceived by a user, wherein
the target vibration corresponds to a second tactile stimulus transferred from a second tactile stimulus generation source, and
the second tactile stimulus generation source is different from the first tactile stimulus generation source; and
a control unit configured to:
control output of a third tactile stimulus of the second tactile stimulus generation source based on the first information and the second information, wherein the third tactile stimulus includes a noise suppression tactile vibration; and
control output of the noise suppression tactile vibration to suppress the detected tactile vibration related to the first information.

2. The control device according to claim 1, wherein the target vibration includes a composite vibration of a plurality of tactile vibrations output by a plurality of second tactile stimulus generation sources,
the second tactile stimulus generation source is one of the plurality of second tactile stimulus generation sources, and
the noise suppression tactile vibration supresses the detected tactile vibration.

3. The control device according to claim 1, wherein the noise suppression tactile vibration supresses a tactile vibration output by a specific second tactile stimulus generation source among a plurality of second tactile stimulus generation sources.

4. The control device according to claim 3, wherein an amplitude of the noise suppression tactile vibration that suppresses the tactile vibration output by the specific second tactile stimulus generation source is less than an amplitude of the tactile vibration output by the specific second tactile stimulus generation source.

5. The control device according to claim 1, wherein the detected tactile vibration is detected by a tactile vibration measurement device.

6. The control device according to claim 1, wherein the second tactile stimulus generation source includes a tactile vibration generation device,
the detected tactile vibration is detected based on an electromotive force generated in the tactile vibration generation device, and
the electromotive force is generated based on a tactile vibration received by the tactile vibration generation device.

7. The control device according to claim 1, wherein the detected tactile vibration includes a tactile vibration that is estimated to be generated.

8. The control device according to claim 1, wherein the noise suppression tactile vibration supresses a tactile vibration at a specific position in a transfer unit to which the noise suppression tactile vibration is transferred.

9. The control device according to claim 8, wherein the specific position includes a position at which the transfer unit comes in contact with the user.

10. The control device according to claim 1, wherein the control unit is further configured to control the second tactile stimulus generation source to output the target vibration.

11. The control device according to claim 10, wherein the control unit is further configured to:
obtain third information regarding a detected target vibration;
compare an amplitude of the detected target vibration with an amplitude of the target vibration corresponding to the second tactile stimulus transferred from the second tactile stimulus generation source; and
control the amplitude of the target vibration based on the comparison.

12. The control device according to claim 10, wherein the control unit is further configured to:
obtain third information regarding a detected target vibration;
determine whether to output the target vibration, wherein the determination is based on a comparison between an amplitude of the detected target vibration and an amplitude of the target vibration corresponding to the second tactile stimulus transferred from the second tactile stimulus generation source; and
stop the output of the target vibration based on the comparison.

13. The control device according to claim 1, wherein the noise suppression tactile vibration supresses a tactile vibration with at least one of a specific frequency or an amplitude.

14. The control device according to claim 13, wherein the specific frequency or the amplitude is decided based on a frequency of the target vibration or an amplitude of the target vibration.

15. The control device according to claim 1, wherein
the control unit is further configured to control a form of the noise suppression tactile vibration based on at least one of information regarding an environment around the user, information regarding a behavior of the user, or information regarding a nature or a form of a transfer unit to which the noise suppression tactile vibration is transferred.

16. A control method, comprising:
obtaining, by a processor, first information regarding a detected tactile vibration, wherein the detected tactile vibration corresponds to a first tactile stimulus transferred from a first tactile stimulus generation source;
obtaining, by the processor, second information regarding a target vibration to be perceived by a user, wherein
the target vibration corresponds to a second tactile stimulus transferred from a second tactile stimulus generation source, and
the second tactile stimulus generation source is different from the first tactile stimulus generation source;
controlling, by the processor, output of a third tactile stimulus of the second tactile stimulus generation source based on the first information and the second information, wherein the third tactile stimulus includes a noise suppression tactile vibration; and
controlling, by the processor, output of the noise suppression tactile vibration to suppress the detected tactile vibration related to the first information.

17. A non-transitory computer-readable medium having stored thereon, computer-executable instructions which, when executed by a computer, cause the computer to execute operations, the operations comprising:
obtaining first information regarding a detected tactile vibration, wherein the detected tactile vibration corresponds to a first tactile stimulus transferred from a first tactile stimulus generation source;
obtaining second information regarding a target vibration to be perceived by a user, wherein
the target vibration corresponds to a second tactile stimulus transferred from a second tactile stimulus generation source, and
the second tactile stimulus generation source is different from the first tactile stimulus generation source;
controlling output of a third tactile stimulus of the second tactile stimulus generation source based on the first information and the second information, wherein the third tactile stimulus includes a noise suppression tactile vibration; and
controlling output of the noise suppression tactile vibration to suppress the detected tactile vibration related to the first information.

* * * * *